(12) United States Patent
Hagiwara et al.

(10) Patent No.: US 9,442,911 B2
(45) Date of Patent: Sep. 13, 2016

(54) ADDING ANNOTATIONS TO A MAP

(71) Applicants: Kenji Hagiwara, Edgewater, NJ (US); Greg Melendez, East Stroudsburg, PA (US)

(72) Inventors: Kenji Hagiwara, Edgewater, NJ (US); Greg Melendez, East Stroudsburg, PA (US)

(73) Assignee: RICOH COMPANY, LTD., Tokyo (JP)

( * ) Notice: Subject to any disclaimer, the term of this patent is extended or adjusted under 35 U.S.C. 154(b) by 189 days.

(21) Appl. No.: 14/151,114

(22) Filed: Jan. 9, 2014

(65) Prior Publication Data
US 2015/0193416 A1 Jul. 9, 2015

(51) Int. Cl.
*G06F 17/24* (2006.01)
*G06F 3/048* (2013.01)
*G06F 3/0482* (2013.01)
*G06F 3/0484* (2013.01)

(52) U.S. Cl.
CPC ........... *G06F 17/241* (2013.01); *G06F 3/0482* (2013.01); *G06F 3/04842* (2013.01)

(58) Field of Classification Search
CPC ................ G06F 3/04842; G06F 17/30241; H04N 21/4524
See application file for complete search history.

(56) References Cited

U.S. PATENT DOCUMENTS

| | | | | |
|---|---|---|---|---|
| 5,793,974 A * | 8/1998 | Messinger | ............... | H04L 41/22 709/223 |
| 5,990,862 A * | 11/1999 | Lewis | ................... | G06F 3/038 715/858 |
| 8,185,887 B2 | 5/2012 | Hattori | | |
| 9,041,707 B2 * | 5/2015 | Ferrara | ................... | G06T 11/00 345/418 |
| 2002/0059211 A1 * | 5/2002 | Kuramochi | ............ | G06Q 10/06 |
| 2004/0001114 A1 * | 1/2004 | Fuchs | ................... | G01C 21/36 715/855 |
| 2006/0075356 A1 * | 4/2006 | Faulkner | ................. | G06T 17/05 715/782 |
| 2010/0008652 A1 * | 1/2010 | Takahashi | ............ | G11B 27/329 386/314 |
| 2010/0171826 A1 * | 7/2010 | Hamilton | ............... | G06Q 30/06 348/135 |
| 2010/0269033 A1 * | 10/2010 | Siegel | ................. | G06F 17/2229 715/234 |
| 2011/0295764 A1 * | 12/2011 | Cook | ..................... | G06Q 10/06 705/348 |
| 2012/0296777 A1 * | 11/2012 | Fugman | ............. | G06Q 30/0281 705/27.1 |
| 2013/0006790 A1 * | 1/2013 | Raskin | ................. | G06Q 10/063 705/26.1 |
| 2013/0294650 A1 * | 11/2013 | Fukumiya | ........ | H04N 21/41415 382/103 |
| 2014/0033077 A1 * | 1/2014 | Katragadda | .......... | G06Q 10/101 715/753 |
| 2014/0111520 A1 * | 4/2014 | Cline | ..................... | H04L 67/18 345/440 |
| 2015/0193469 A1 * | 7/2015 | Hagiwara | .............. | G06Q 10/10 345/589 |

FOREIGN PATENT DOCUMENTS

WO WO2012158284 * 11/2012 ........... G06Q 10/101

OTHER PUBLICATIONS

Using Acrobat Commenting and Markup tools, from Adobe Acrobat X step by step guide, Oct. 2010, pp. 1-21 https://technofabulousstuff.wikispaces.com/file/view/Acrobat_comment_markup.pdf/178222633/Acrobat_comment_markup.pdf.*
Page Margins Jul. 27, 2013, pp. 1-3 https://web.archive.org/web/20130727173928/http://www.gcflearnfree.org/word2013/9.2.*

(Continued)

*Primary Examiner* — Scott Baserman
*Assistant Examiner* — Mario M Velez-Lopez
(74) *Attorney, Agent, or Firm* — Cooper & Dunham LLP

(57) ABSTRACT

Systems, apparatuses and methods are provided to allow a user to insert annotations or comments in a map application and place such annotations or comments on a digital map, as desired by the user.

18 Claims, 24 Drawing Sheets

(56) References Cited

OTHER PUBLICATIONS

U.S. Appl. No. 13/758,082, Kenji Hagiwara et al., filed Feb. 4, 2013.
U.S. Appl. No. 13/758,089, Kenji Hagiwara et al., filed Feb. 4, 2013.
U.S. Appl. No. 13/758,097, Kenji Hagiwara et al., filed Feb. 4, 2013.
U.S. Appl. No. 13/758,116, Greg Melendez et al., filed Feb. 4, 2013.
U.S. Appl. No. 13/758,110, Greg Anderson et al., filed Feb. 4, 2013.
U.S. Appl. No. 14/151,124, Kenji Hagiwara et al., filed Jan. 9, 2014.

* cited by examiner

Add Building Information

Step 1: Building Properties

Building Name: Branch Office

Street Address: 10-93 Sloan St. New York, NY 10012

[ Next Step ]

---

Step 2: Define Floors                    Edit

Number of Floors: 0

---

Step 3: Define Workgroups                Edit

Number of Workgroups: 0

Fig. 7C

Register Devices

| | Walkthrough ID | Manufacturer | Device Name | Device Type | Status |
|---|---|---|---|---|---|
| ☒ | 1 | Canon | PIXMA 600 | Printer | Working |
| ☐ | 2 | Ricoh | Aficio 2075 | MFP (mono) | Broken |
| ☐ | | Ricoh | Aficio 1097 | MFP (color) | Out of Paper |
| ☐ | 3 | HP | ENVY 4500 | Printer | Good |
| ☐ | | Xerox | D95 | MFP (color) | Working |

Ricoh | Search

Edit | Add | Import | Delete | More Details

Back | Next

Fig. 7F

| Item | Description |
|---|---|
| System ID | System IDs assigned to each device by system. |
| Walkthrough ID | Walkthrough IDs assigned to each device by analyst. |
| Manufacturer Name | Manufacturer Name of the device |
| Device Name | Model Name of the device<br>When users add their defined device, users can enter the product name. |
| Device Type | Device Type (i.e. MFP, Printer, etc.) |
| Device Age (months) | Age of the device (i.e. days, months, years) |
| Out of Scope | The device is out of scope for TCO calculation or not |
| Serial Number | Serial Number |
| Asset Tag | Asset Tag |
| IP Address | IP Address |
| MAC Address | MAC Address |
| SAP Address | SAP Address |
| Queue Name | Queue Name |
| Host Name | Host Name |
| Room | Room where the device is placed |
| Cube | Cube where the device is placed |
| Business Unit | Business Unit the device placed |
| Department | Department the device placed |
| Division/Cost Center | Decision/Cost Center for the device |
| Monthly Volume Mono | Monthly total Mono volume (counter) |
| Monthly Volume Color | Monthly total Color volume (counter) |
| Connectivity (Network, Local, Not Connected) | Connectivity of the device |
| Total Monthly Cost | Total Monthly Cost calculated by the system. |
| Total Cost Per Paper | Total Cost per Paper calculated by the system |
| Custom Field1 - 10 | User Defined Custom Fields. The field name is displayed as a value configured in Enterprise Level - Parameter Tab. |

Fig. 10

ADDING ANNOTATIONS TO A MAP

TECHNICAL FIELD

This disclosure relates to systems, apparatuses, methodologies, computer program products, etc., that employ a map to aid a user, and more particularly, such tools that permit a user to place annotations on the map.

BACKGROUND

In the current information age, there are often discussions of the desirableness of a paperless society. However, notwithstanding such discussions, there remains a need by users of computers and information terminals for printing functionality. Therefore, devices having printing functionality, such as printers, copiers, multi-function devices, etc., continue to play a significant role in information technology (IT) at home and at work.

Further, mobile devices such as smartphones, notebook and laptop computers, PDAs (personal digital assistants), tablet computing devices, and so forth, are becoming extremely prolific. Such devices allow the user to access documents and data in many different locations. In many cases, a mobile device is employed to access information, while the user is on-the-go, in an IT environment with which the user may not be familiar and/or in which the user is unaware of the IT resources available to the user in that environment.

In such mobile culture, digital maps and floor plans (each of which is broadly referenced herein as a "map") are employed to assist the user to locate things, people, etc. Although some digital maps also provide annotations, such annotations are typically hard-coded and the user does not necessarily have the option to add his or her own annotations. In the few instances in which the user can add annotations to the digital map, such annotations can only be placed in preassigned locations which is not particularly helpful when the annotations are directed to a specific object shown on the map, but the identity and/or location of the object cannot be readily determined from the annotation.

There remains a need for improvements to allow users to optimize use of digital maps.

SUMMARY

Various tools (for example, a system, an apparatus, application software, etc.) can be configured to provide additional features for improved use of digital maps.

In an aspect of this disclosure, a map application provided to a user includes a map display interface that displays a map on an electronic display, and an annotation interface that captures user-entered notes as an annotation object, and causes the map display interface to display the annotation object capturing the user-entered notes. The annotation interface permits the user to relocate the annotation object from a first position (for example, in the map display area) to another position. Thus, if the first position at which the map application places the annotation object is not desirable (such as, for example, obscuring some information that may of interest to the user), the user can relocate the annotation object to another position that is more preferred.

For example, the map application may be provided as an enterprise application allow the user to determine the information technology devices available to a user at an office facility. In such example, the map can be a floormap and device objects are shown on the floormap, and the map display interface is configured to permit user selection of a device object shown on the floormap, and to associate the annotation object with the selected device object. The annotation object may be shown initially near the device object to which the annotation object is associated, and the user can relocate the annotation object, such as to a position outside of the map display area.

Further, a user interface part may be provided for the user to turn on and turn off display of the annotation object. Thus, the user can selectably show the annotation object, even after the annotation object has been added.

In another aspect, a device details user interface can be provide to receive user input (or selection) of device parameters or other device-associated values, associated with a selected device object. On the other hand, one or more device-associated values may be automatically inserted in the displayed annotation object.

In another aspect, the displayed floormap may include both (i) a floor portion corresponding to space on the floor of the office facility and (ii) a whitespace portion disposed to border at least one side of the floor portion (or surrounds the floor portion) and outside of (i.e. not overlapping with) the floor portion. In another example, the whitespace portion surrounds the floor portion. the map display interface automatically places the annotation object in the whitespace portion.

In another aspect, a whitespace adjustment part is provided for user adjustment of position, size and/or dimensions of the whitespace portion, and the map display interface dynamically adjusts the displayed whitespace portion in response to the user adjustment.

BRIEF DESCRIPTION OF THE DRAWINGS

The aforementioned and other aspects, features and advantages can be more readily understood from the following detailed description with reference to the accompanying drawings wherein:

FIGS. 7A-7H show respective examples of user interface screens provided by a map application, according to an exemplary embodiment;

FIG. 10 shows a table containing examples of additional information that can inserted in a comment box.

DETAILED DESCRIPTION

Figure 1:
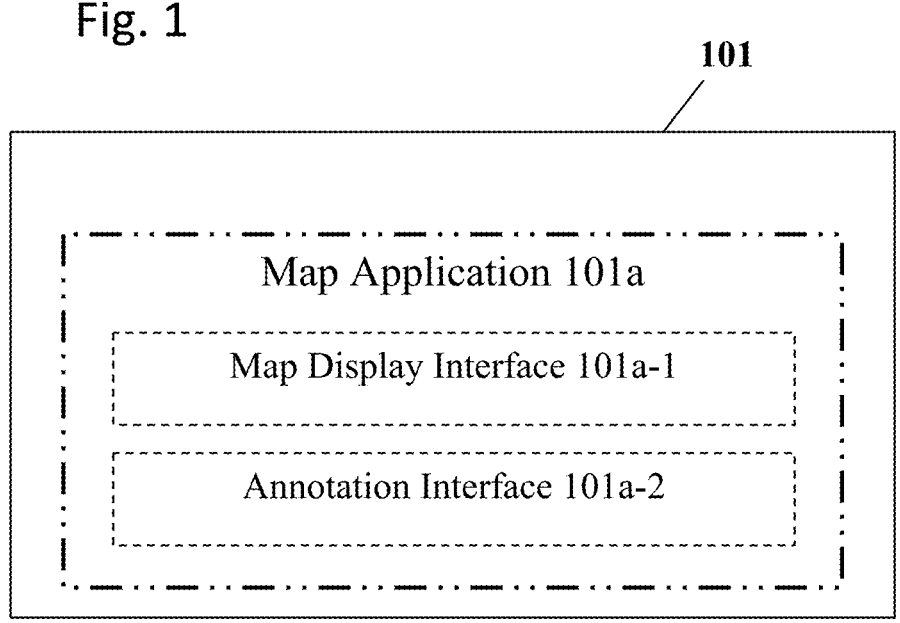
FIG. 1 shows a block diagram of an application that can be provided on or to a terminal, to permit annotation of digital maps, according to an exemplary embodiment.

In describing preferred embodiments illustrated in the drawings, specific terminology is employed for the sake of clarity. However, this disclosure is not intended to be limited to the specific terminology so selected and it is to be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (such as systems, apparatuses, methodologies, computer program products, etc.) for placing annotations on a digital map.

FIG. 1 shows schematically a block diagram of a map application 101a provided on or to a terminal 101 and including a map display interface 101a-1 and an annotation interface 101a-2.

The terminal 101 can be any computing device, including but not limited to a personal, notebook or workstation computer, a kiosk, a PDA (personal digital assistant), a mobile phone or handset, another information terminal, etc., that can communicate with other devices through the network 104. The terminal 101 is further described infra with reference to FIG. 4.

The map application 101a may be provided on or to the terminal 101 to display, on demand, a map electronically on the terminal 101, to provide visual indications of location of devices, objects, etc. Such application may be a native program installed on the terminal 101, or may be provided from an external source as an application and/or as part of a platform, or may be provided as a service (e.g., software as a service, i.e. SaaS).

The map display interface 101a-1 displays a map via a display on the terminal 101. The map may be any type of two-dimensional visual representation of an area. In this case, the map shown by the map display interface 101a-1 is the floor plan of a floor of a building. The map displaying the floor plan may contain icons which can represent objects such as chairs, desks, bookshelves, cabinets, doors, stages, tables, sofas, etc. In addition, icons representing printers, scanners and multifunctional printers (MFP) may exist as well. Further, conventional options such as zooming, panning, scrolling, etc. are supported by the map display interface 101a-1 as well. Moreover, features such as increasing or decreasing the white space area around the map can also be performed by the map display interface 101a-1.

The annotation interface 101a-2 receives input (i.e. comments, descriptions, identifiers, etc.), entered by the user, via the terminal 101, places such information in a comment object which corresponds to an icon (i.e. devices, physical objects, etc.) and displays that icon along with the comment object superimposed on the map. The input may be comments or descriptions regarding a device located in the map. For example, the device can be an MFP, a printer, a scanner, a fax machine, a television, a computer, a telephone, etc and the comments can be the name of the device, the type of the device (i.e. printer, scanner, MFP, etc.) the company that manufactured the device, the age of the device, etc. Further, the comment object may be in the form of a box which contains the comments inside of it and the comment box may be connected to the icon representing the corresponding device via a line (e.g., dashed, dotted, colored, etc.). In this case, the user may select the comment box and move it from one position while the icon remains in a static position. The line connecting the comment box also adjusts itself due to this movement. Consequently, the user may be able to move the comment box to a position that the user finds to be the most appropriate. Conversely, the same action can be performed on the icon as well with the comment box remaining static.

Figure 2A:
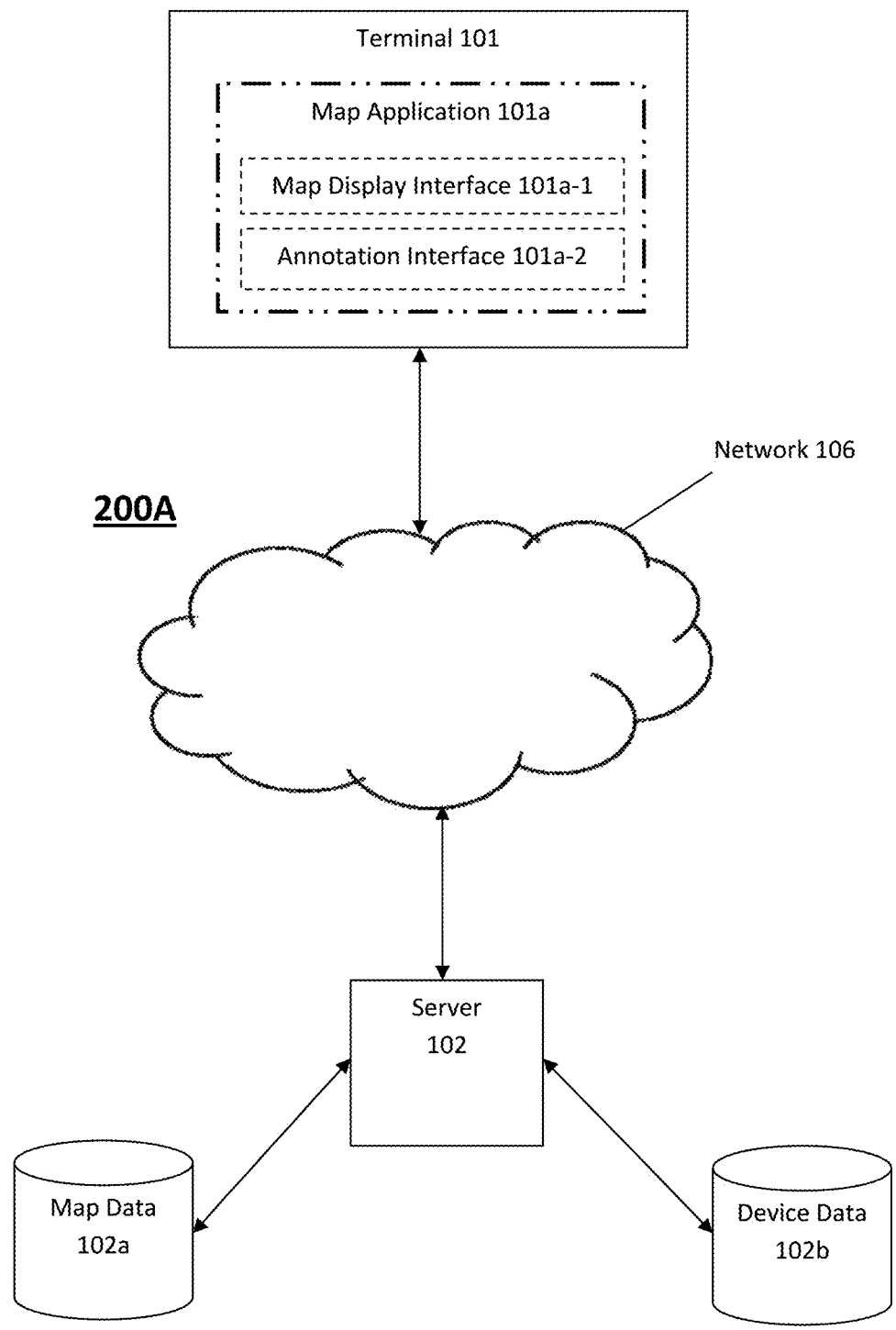
FIG. 2A shows a block diagram of a system in which an application can be provided to a terminal to enable the terminal to access a digital map and add annotations, according to an exemplary embodiment.

FIG. 2A shows schematically a system 200A that includes a terminal 101 and a server 102, all of which are interconnected by network 106. Although only one terminal is shown in FIG. 2A, it should be understood that the system 200A can include a plurality of user terminal devices (which can have similar or different configurations).

The server 102 is connected to network 106, and may provide the map application 101a, on demand, to a requesting device, such as terminal 101. In such instance, the map application 101a is not pre-installed on the terminal 101 and is instead downloaded, or provided as a service, to the terminal 101 from another location (e.g., the server 102). Thus, in the case in which the user wishes to access the map application 101a, the terminal 101 may send a request to the server 102. In response to such request, the server 102 may provide the map application 101a to the terminal 101. However, before sending the software the server 102 may check user credentials. If the user has authorization to access the features of the map application 101a, the server 102 provides the map application 101a to the terminal 101. Otherwise, the map application 101a is not provided to the terminal 101.

In an exemplary embodiment, the server 102 may also be used to access information regarding maps and devices which are stored in the map database 102a and device database 102b, respectively. For example, the map database 102a may store maps of buildings and the corresponding floor plans for each floor of the building. There may be multiple building data stored in the map database 102a. Further, the maps stored may be in a variety of formats such as PDF, GIF, JPEG, Bitmap, PNG, etc. On the other hand, the device database 102b stores information regarding devices such as printers, MFPs, scanners, etc. This information may include name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), output technology (e.g., laser, inkjet solid ink, thermal, other technology, etc.), supply level (e.g., level of consumable, such as paper and toner, is empty, low, ok, etc.), pages per job (e.g., 1, 2, 6-10, etc.), color technology (e.g., professional color, convenience color, etc), device properties (e.g., manufacturer, model, serial number, etc), etc. of each of the devices. It should be noted that the device information stored in the device database 102b is not required to contain device information of devices connected to network 106 only. It may contain device information of devices that are not connected to network 106 as well. Therefore the user may access the server 102 to obtain information regarding maps and devices without having to manually input the information, thereby making it more convenient for the use. The server 102 is further described infra with reference to FIG. 3.

The network 106 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 106. In addition, the network 106 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2B:
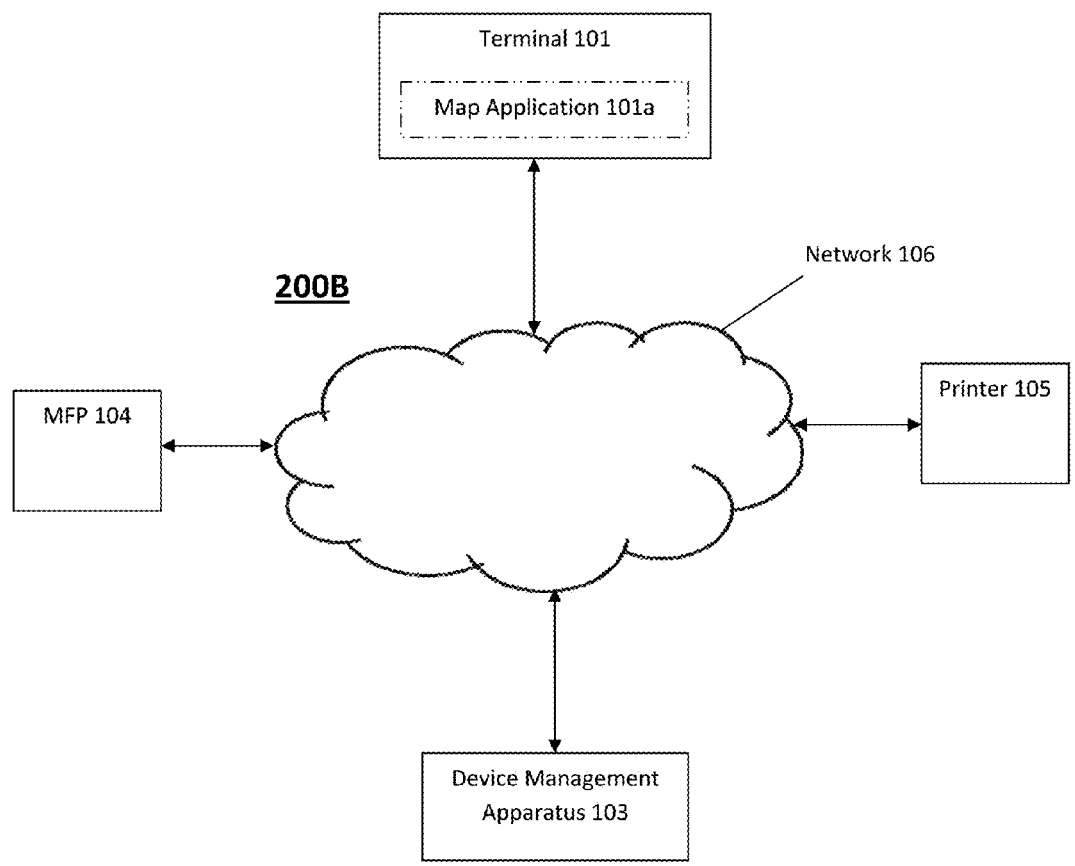
FIG. 2B shows a block diagram of a system in which an application is provided on or to a terminal to enable the terminal to obtain information regarding devices in the system, according to another exemplary embodiment.

FIG. 2B shows schematically a system 200B, according to another exemplary embodiment. The system 200B is similar to the system 200A of FIG. 2A except that the system additionally includes a device management apparatus 103, MFP 104 and a printer 105.

The terms "printer" and "printer device" are used hereinafter generically to include any output device having a printing or plotting functionality, and include multifunction devices having a copy and/or scanning functionality in addition to the printing or plotting functionality.

The device management apparatus 103 collects data from a plurality of devices throughout the network 106. For example, the device management apparatus 106 may store information regarding the MFP 104 and/or the printer 105. This information may include a name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), output technology (e.g., laser, inkjet solid ink, thermal, other technology, etc.) supply level (e.g., level of consumable, such as paper and toner, is empty, low, ok, etc.), pages per job (e.g., 1, 2, 6-10, etc.), color technology (e.g., professional color, convenience color, etc), properties (e.g., manufacturer, model, serial number, etc), etc. The device management apparatus 103 may send this information to the terminal 101 when requested. Consequently, the user can easily obtain information regarding devices connected to network 106 without having to manually input the information, thereby making it more convenient for the use. The device management apparatus 103 is further described infra with reference to FIG. 3.

Figure 5:
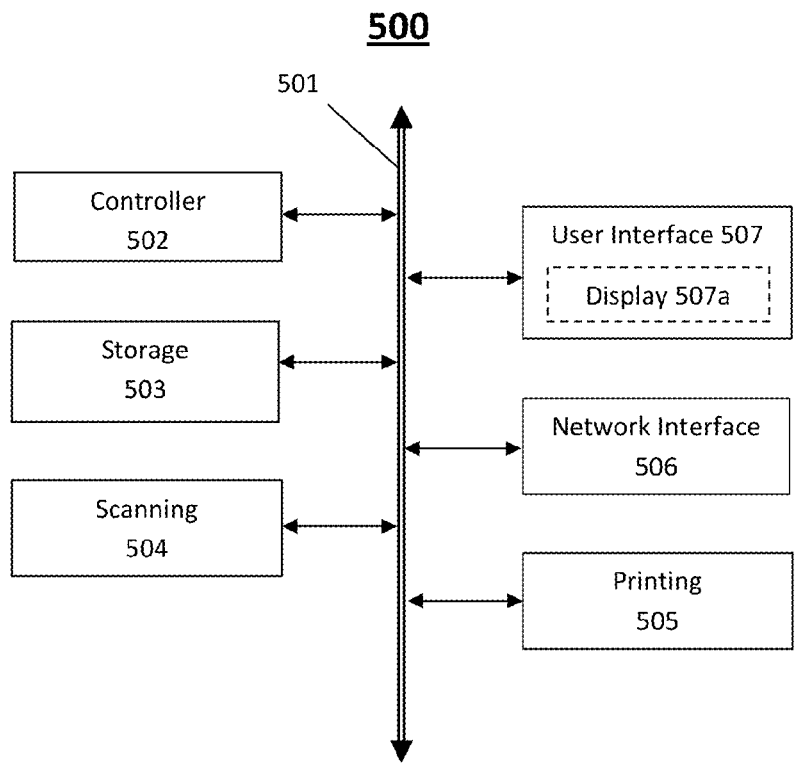
FIG. 5 shows a block diagram of an exemplary configuration of a multi-function device.

The MFP 104 can be, for example a printer/scanner, printer/scanner/fax, etc. While this example of this disclosure simply refers to a single MFP 104 and a single printer 105 in the interest of brevity, it should be appreciated that the network environment can have an arbitrary number of MFP and printer devices. The MFP 104 may be configured as shown in FIG. 5, which is discussed infra.

Otherwise, operations of the elements of the system 200B are similar to those discussed in connection with the corresponding elements of the system 200A of FIG. 2A.

Figure 3:
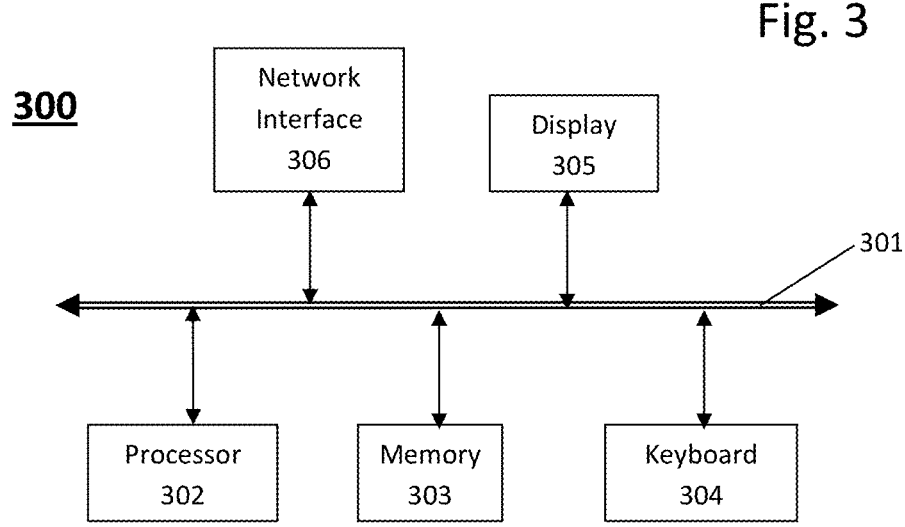
FIG. 3 shows a block diagram of an exemplary configuration of a computing device.

FIG. 3 shows an exemplary constitution of a computer 300 that can be configured (for example, through software) to operate (at least in part) as the server 102 of FIG. 2A, and/or as the device management apparatus 103 of FIG. 2B. The computer 300 includes a processor (or central processing unit) 302 that communicates with a number of other components, including a memory or storage part 303, keyboard 304, display 305 and network interface 306, by way of a system bus 301. The computing device 300 may be a special-purpose device (such as including one or more application specific integrated circuits or an appropriate combination of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
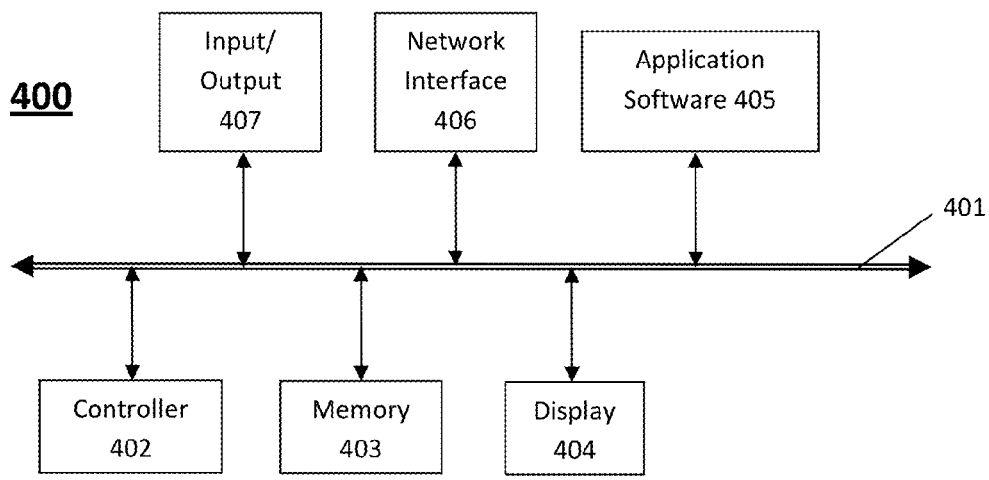
FIG. 4 shows a block diagram of an exemplary configuration of a terminal.

FIG. 4 shows an exemplary constitution of the terminal 101 of FIGS. 2A and 2B (for example, as a computer). In FIG. 4, a computer 300 includes a controller (or central processing unit) 402 that communicates with a number of other components, including memory 403, display 404, application software 405, network interface 406 and input/output (such as mouse, keyboard, touchpad, stylus, microphone and/or speaker with voice/speech interface and/or recognition software, etc.) 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 406 provides a connection (for example, by way of an Ethernet connection or other network connection which supports any desired network protocol such as, but not limited to TCP/IP, IPX, IPX/SPX, or NetBEUI) to the network to which the computer 400 is connected (e.g., network 106 of FIGS. 2A and 2B).

The application software 405 is shown as a component connected to the internal bus 401, but in practice is typically stored in storage media such as a hard disk or portable media, and/or received through the network, and loaded into memory 403 as the need arises.

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities.

The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a network interface (I/F) 506 and a user interface 507.

Storage 503 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 506, and interactions with users through the user interface 507.

The network interface 506 is utilized by the MFP 500 to communicate with other network-connected devices such as a terminal or a device management apparatus (e.g., the device management apparatus 103 of FIG. 2B) and receive data requests, print jobs, user interfaces, and etc.

The user interface 507 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 506 can be displayed on the display screen.

The display screen does not need to be integral with, or embedded in, a housing of the MFD 500, but may simply be coupled to the MFD 500 by either a wire or a wireless connection. The I/O 507 may include keys and/or buttons (such as graphical keys or buttons, or other graphical elements, of a GUI on a touchscreen display) for inputting information or requesting various operations. Alternatively, the I/O 507 and the display screen 507*a* may be operated by a keyboard, a mouse, a remote control, voice recognition, or eye-movement tracking, or a combination thereof.

Scanning 504, printing 505, and network interface 506 are otherwise conventional, and therefore, a detailed description of such conventional aspects is omitted in the interest of clarity and brevity.

The MFP 500 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 6:
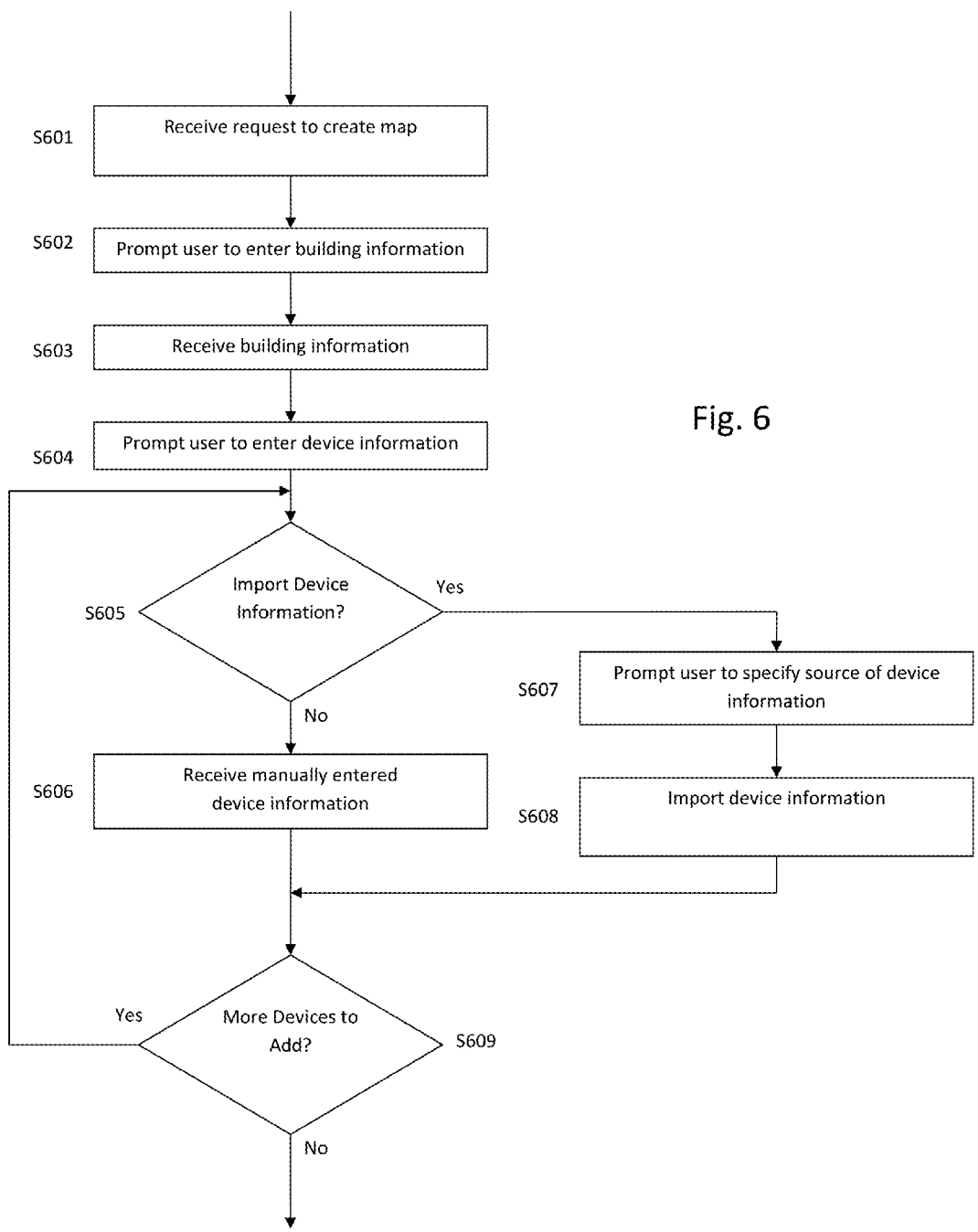
FIG. 6 shows a flow chart of a method performed in the system shown in FIG. 2B.

FIG. 6 shows a process performed by a terminal (e.g., 101), for adding a map and associating devices with the map, according to an exemplary embodiment.

Figure 7A:
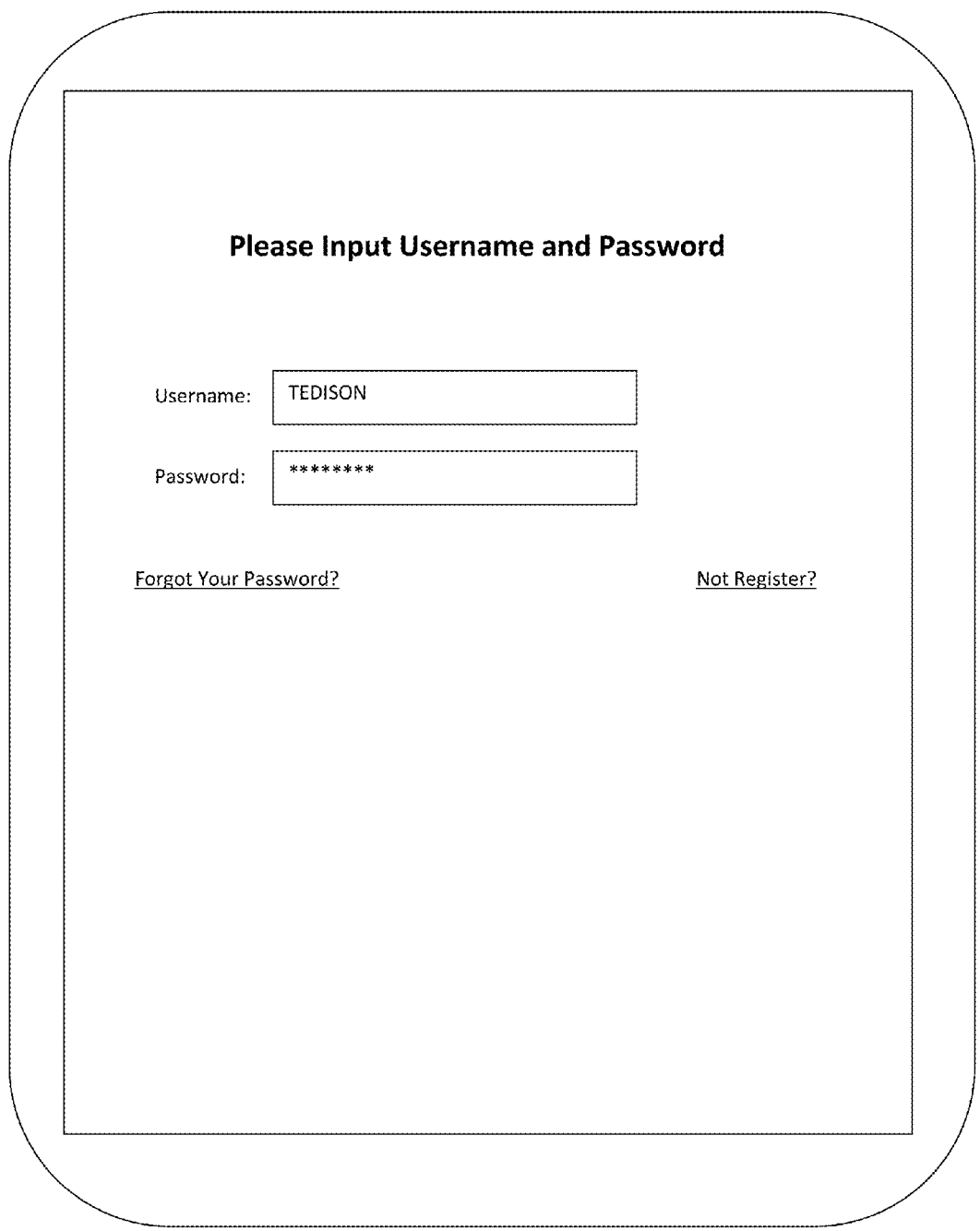

When a user wants to create a map, the user may login to the map application 101*a* located in the terminal 101, as shown in FIG. 7A. Next, the user may have access to a number of options, after login, as illustrated by way of example in FIG. 7B. For example, the user may be permitted to select from options such as "Create New Map", "View/Edit Existing Maps", "Add/Edit Buildings", "Add/View/Edit Devices", "Import Data" and "Settings".

Figure 7B:
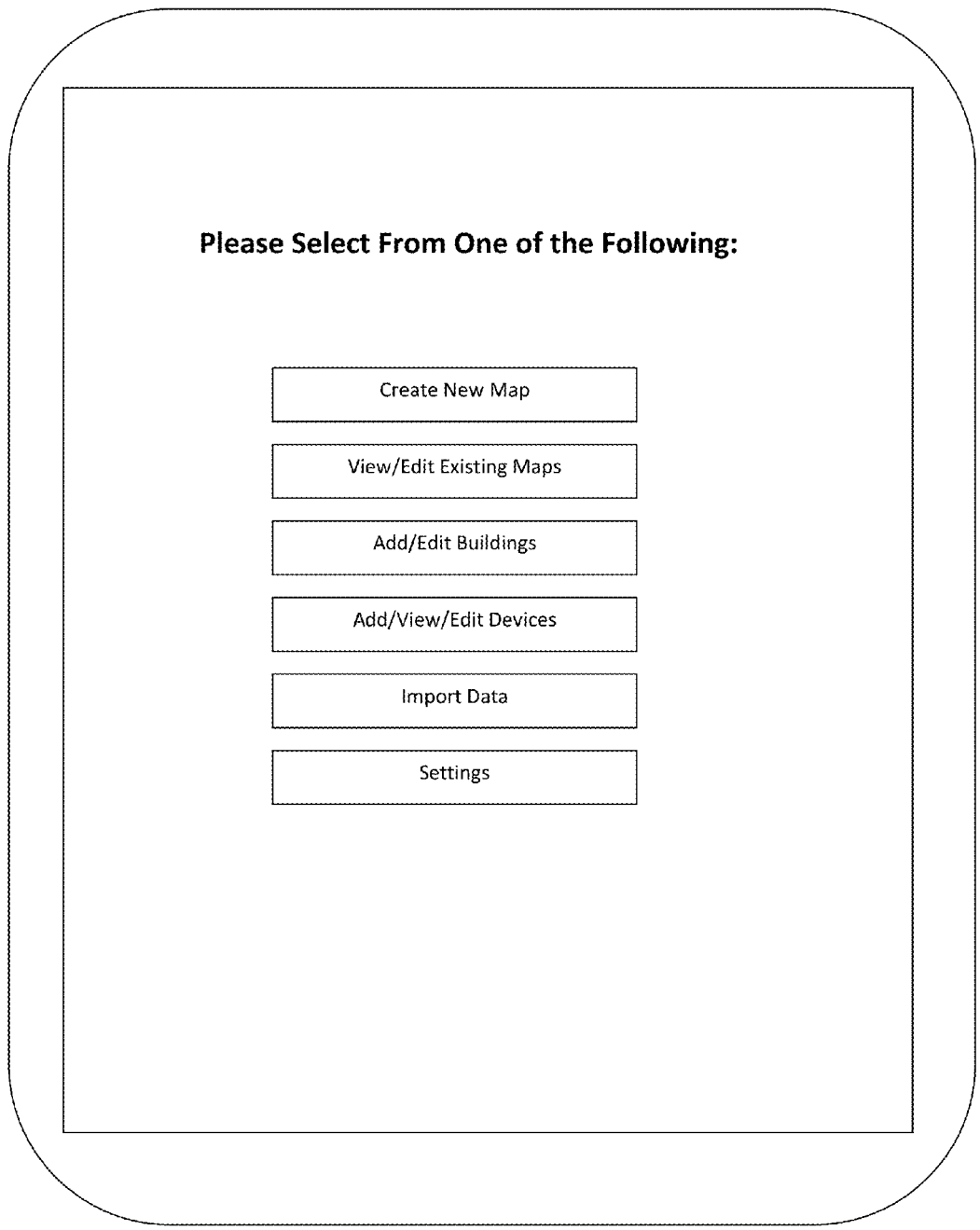
Figure 7D:
Figure 7E:

The user may create a map by pressing the "Create New Map" button (step S601). Next, the application 101*a* prompts the user to enter information regarding the building containing the floor that the user wishes to map (step S602), as illustrated in FIGS. 7C, 7D and 7E. As shown, there are multiple steps to the process in which user is to enter building information (step S603). In the initial stage, the user is prompted to enter information for "Building Properties" which includes the name of the building and its street address. After entering the information, which in this case is "Branch Office" for building name and "10-93 Sloan St. New York, N.Y. 10012" for Street Address, the user may press the "Next Step" button to continue entering more information. In the next step which is "Define Floors", the user is prompted to select the number of floors in the building and a name for identifying each floor. In the example shown, the user has entered "3" for the number of floors in the building. Further, the user has assigned the name for floor "1" as "Ground", floor "2" as "Cafeteria/Theatre" and floor "3" as Offices. It should be noted that the numbers "1", "2" and "3" denote the physical floors of each building. In other words, designates the lowest floor while in this case, "3" denotes the highest floor.

After performing this task, the user once again presses the "Next Step" button to advance to a third step which is "Define Workgroups" and, in this case, is the final step. Here, the user enters information regarding workgroups which are structures that represents a group of employees within a certain floor. For example, there might be a workgroup for a marketing or prototype division. It should be noted that this is an optional step as the user is not required to enter workgroup information. However, in the case that the user wishes to do so, the user firsts selects a floor in the building, then selects the number of workgroups to be allocated for that floor and then creates an identifier for each of those workgroups. In this case, the user has selected the third floor which is "Offices" and "2" for the number of workgroups. The user has named each of the two workgroups "Engineers" and "Managers". After completing the building information the user may perform editing by pressing the "Edit" button for each section to perform edits in the case of an errors. The user may further add more buildings to be registered by pressing the "Add More" button as well. Once the user is finished, the user may proceed to the next step by pressing the "Next" button.

Figure 7G:
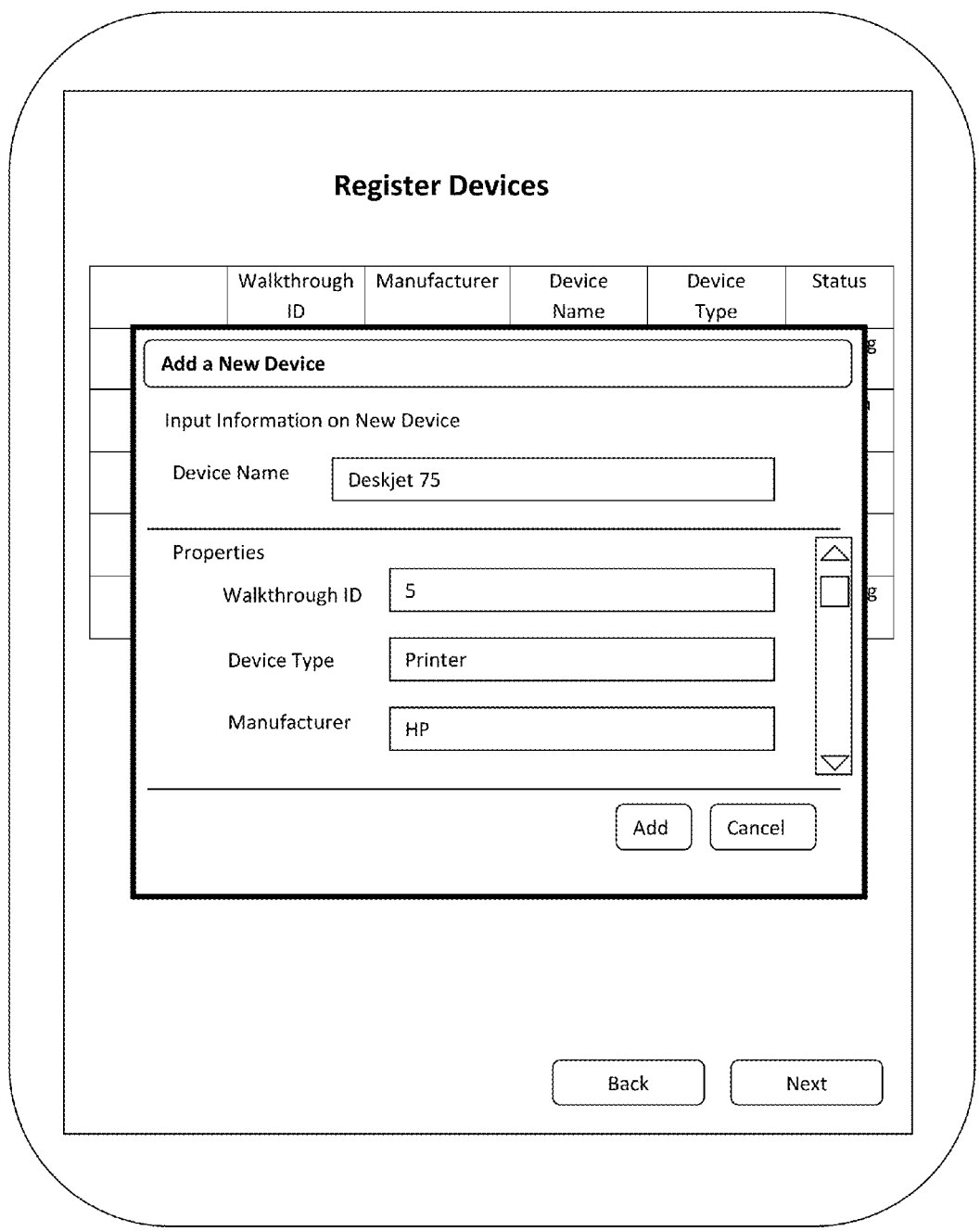

The application 101*a* may then prompt the user to enter device information (step S604), as shown in FIG. 7F. The user may add comments to devices that are on each floor of the building. As illustrated, the user has several options from which to select. In addition, the user also has the option of manually adding device information or importing device information from an external source. For example, in the case that the user decides to manually add device information (step S605, No) instead of importing device information, the user may press the "add" button which causes the application 101*a* to present a user interface screen, such as shown in FIG. 7G, through which the user can manually input information without the requirement to select preset device options. Thus, the user can input any type of characters for the "Device Name", "Walkthrough ID", "Device Type" and "Manufacturer" categories. It should be noted that the user is not required to enter all of the information for each category. The user may simply enter only information for the "Device Name" category. After the user has finished with inputting the device information (step S606), it is added to the registered data, as shown in FIG. 7F.

Figure 7H:
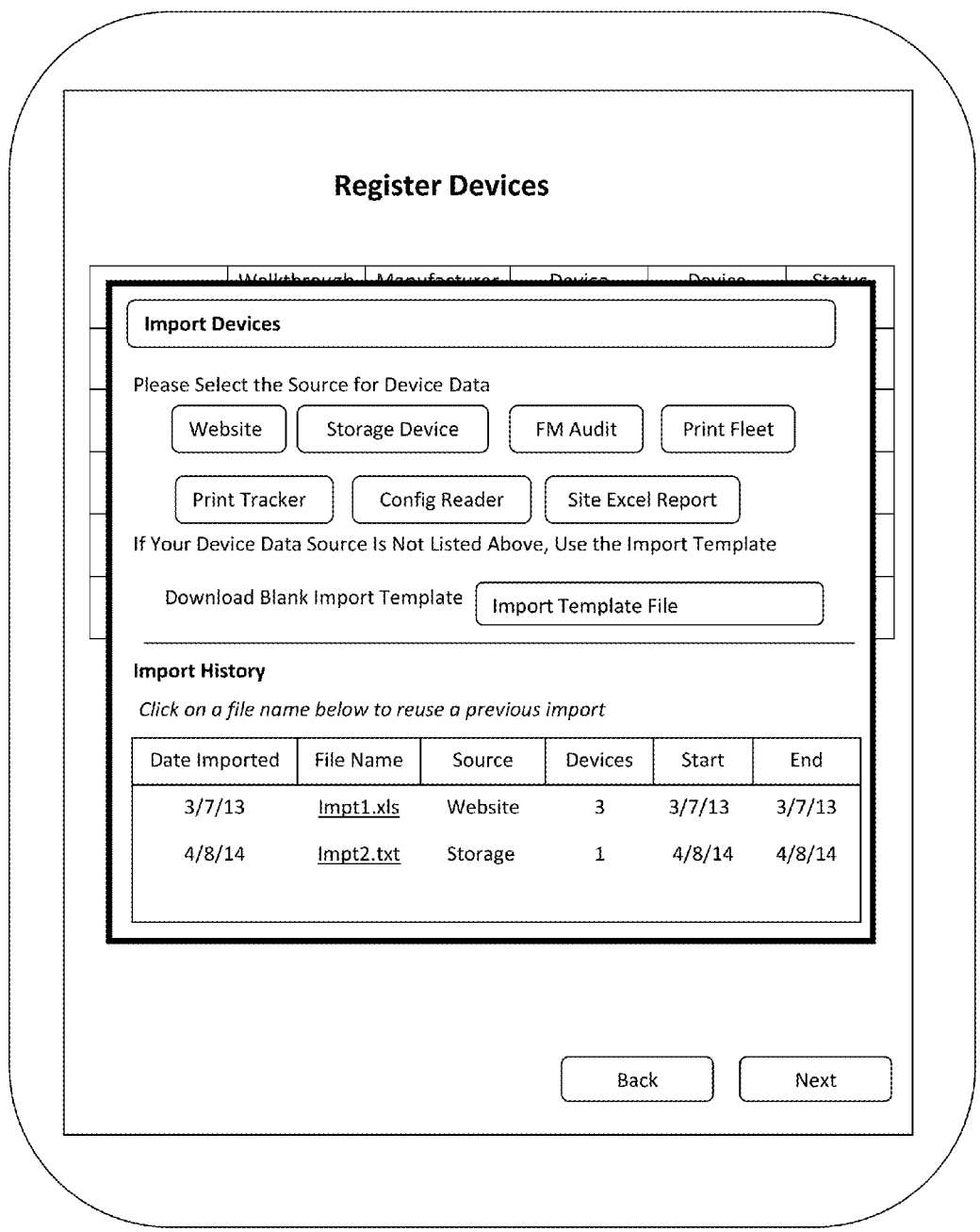
Figure 8:
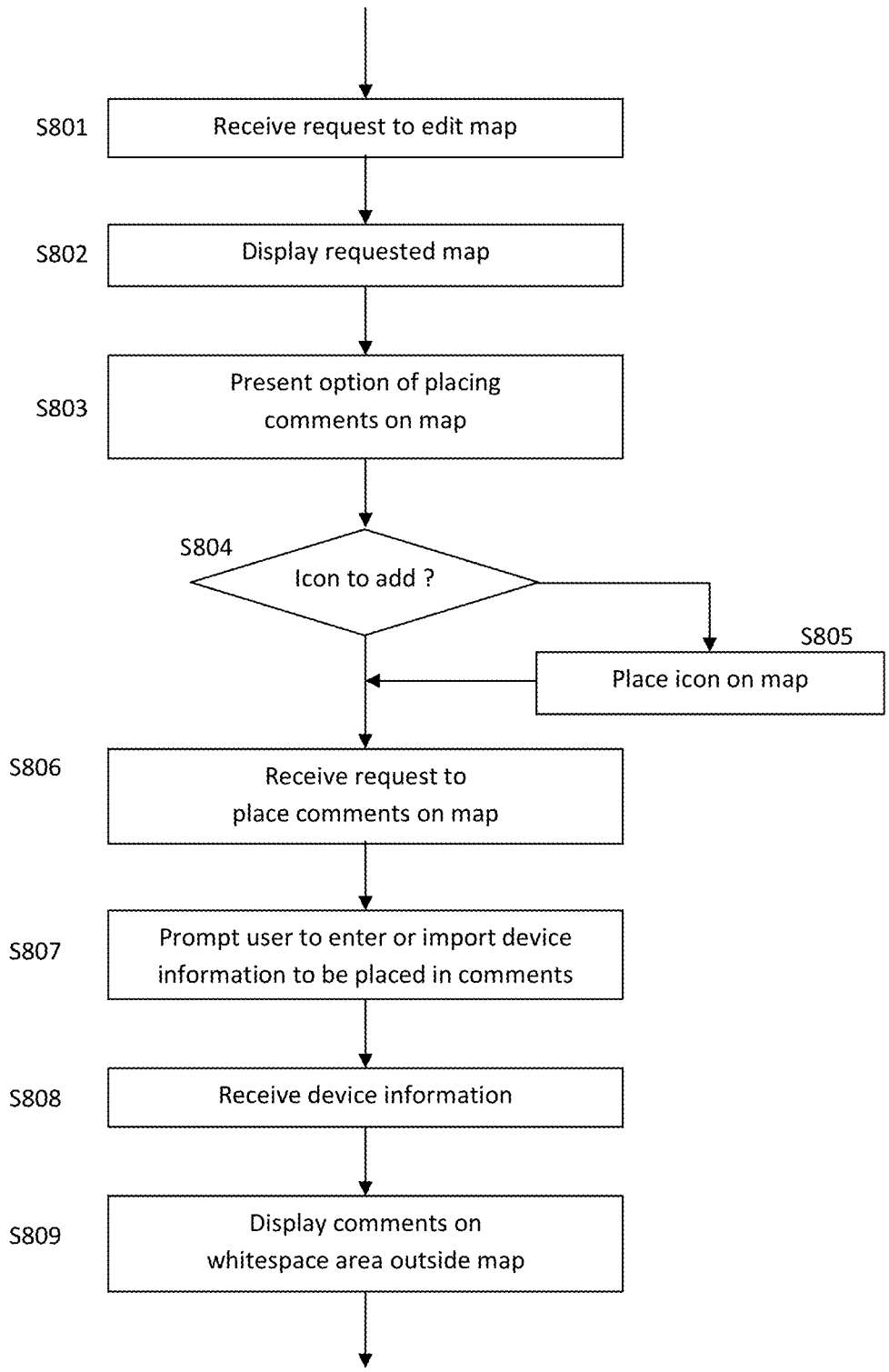
FIG. 8 shows a flow chart of a method performed by a map application, according to an exemplary embodiment.

On the other hand, in the case that the user selects to import device information (step S605, yes), the application 101a presents to the user a user interface screen such as illustrated in FIG. 7H to prompt the user to select a source to import the device information from (step S607). As shown, the user may select from a variety of sources. For example, the user may download it from a certain website or may instead procure it from a storage device that can be accessed by the application 101a. In addition, in the case that the device source is not listed among the selections, the user can download a blank import template instead to compensate for this. Further, the user may be also presented with his or her import history. For example, information regarding the import history may include but is not limited to the date imported, the file name of the imported file, the source, the number of device information for each device that were imported, the start time of the import and the end time of the import. Moreover, the significance of the import history is that the user may select a file that was imported. Consequently, the user is not required to search for the source of such file. After importing the device information (step S608), the terminal adds the information to the registered information shown in FIG. 7F. After adding the device information either through manual input or through importing the device data, the user may still have the opportunity to add more device information. In the case that the user decides to do this (step S609, yes) the user may simply press the "add" or "import" buttons. On the other hand, after the user has finished (step S609, no), the user is prompted to proceed to the next step.

In an exemplary embodiment, the user may also perform a search for the devices instead of manually inputting the information or importing data. For example, the terminal 101 may be connected to a network of an organization which has multiple MFPs or printers connected to it as well. The user may perform a search for the devices connected to the network and add them to the list.

A process performed by the map application 101a, for displaying comments on a map, according to an exemplary embodiment, will now be discussed with reference to FIG. 8 and FIGS. 9A-9H.

Figure 9A:
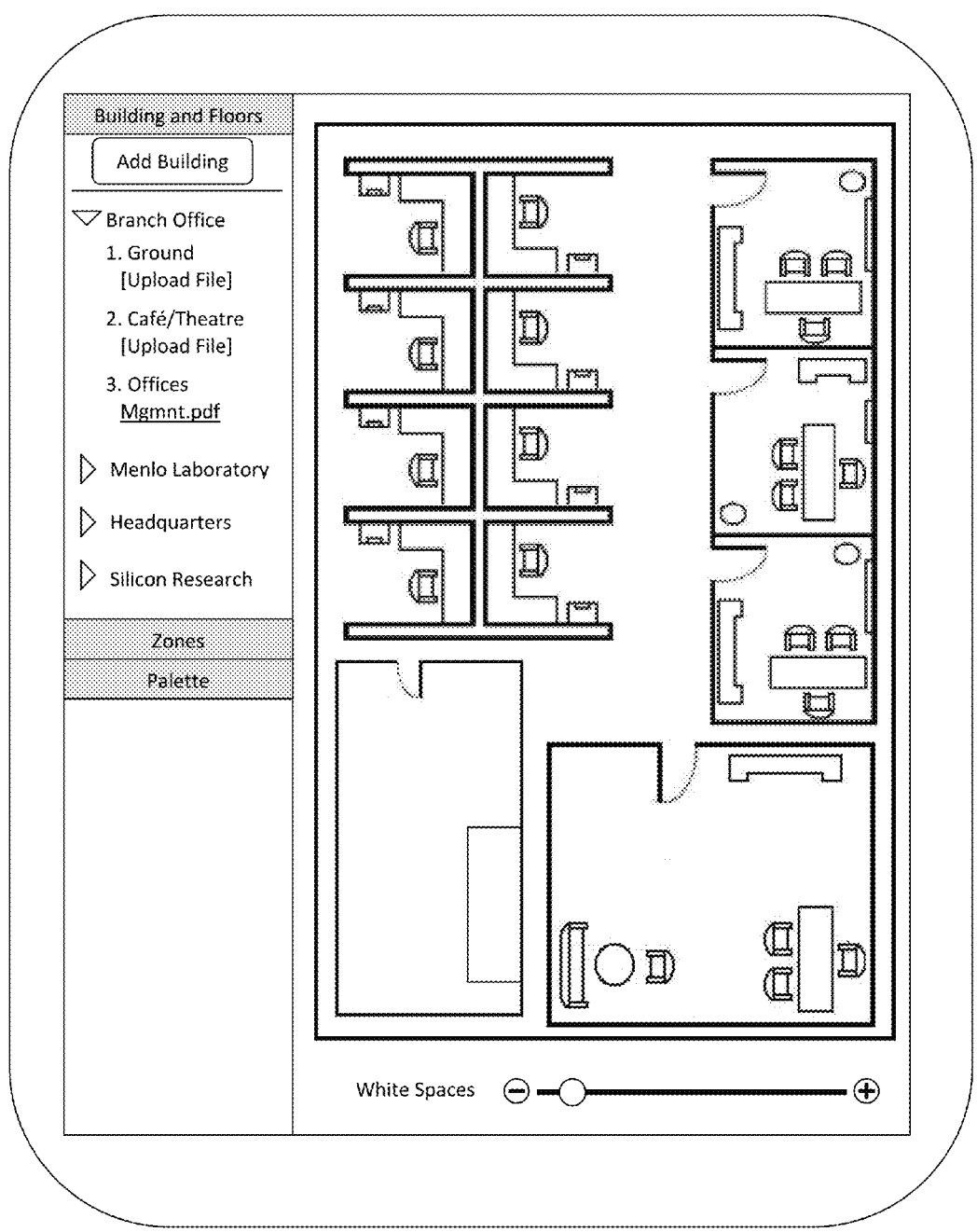
FIGS. 9A-9H show examples of user interface screens provided by a map application, according to an exemplary embodiment.

When the user has finished providing information regarding the buildings and the devices, the user is now able to upload and edit floor maps to the terminal 101. As shown in FIG. 9A, the user can access information of various locations that have been registered. In the example shown in FIG. 9A, four buildings have been registered, including "Branch Office", "Menlo Laboratory", "Headquarters" and "Silicon Research". Further, by expanding the tabs of each building, the user is able to view the floors and their corresponding names that make up the building. In addition, the user is also able to upload floor maps which represent each floor by pressing the "[Upload File]" button for each floor. In this case, the user has uploaded a floor map for the floor "Offices" using the file "Mgmnt.pdf". After uploading the file, the user is shown a preview of the floor map on the right portion of the user interface screen. It should be noted that in this case, the file is a PDF format. However, it may not be limited to this. Other file types such as JPEG, Bitmap, GIF, PNG and etc. may be used instead. After the file has been uploaded, the user may press the floor map to edit it.

Figure 9B:
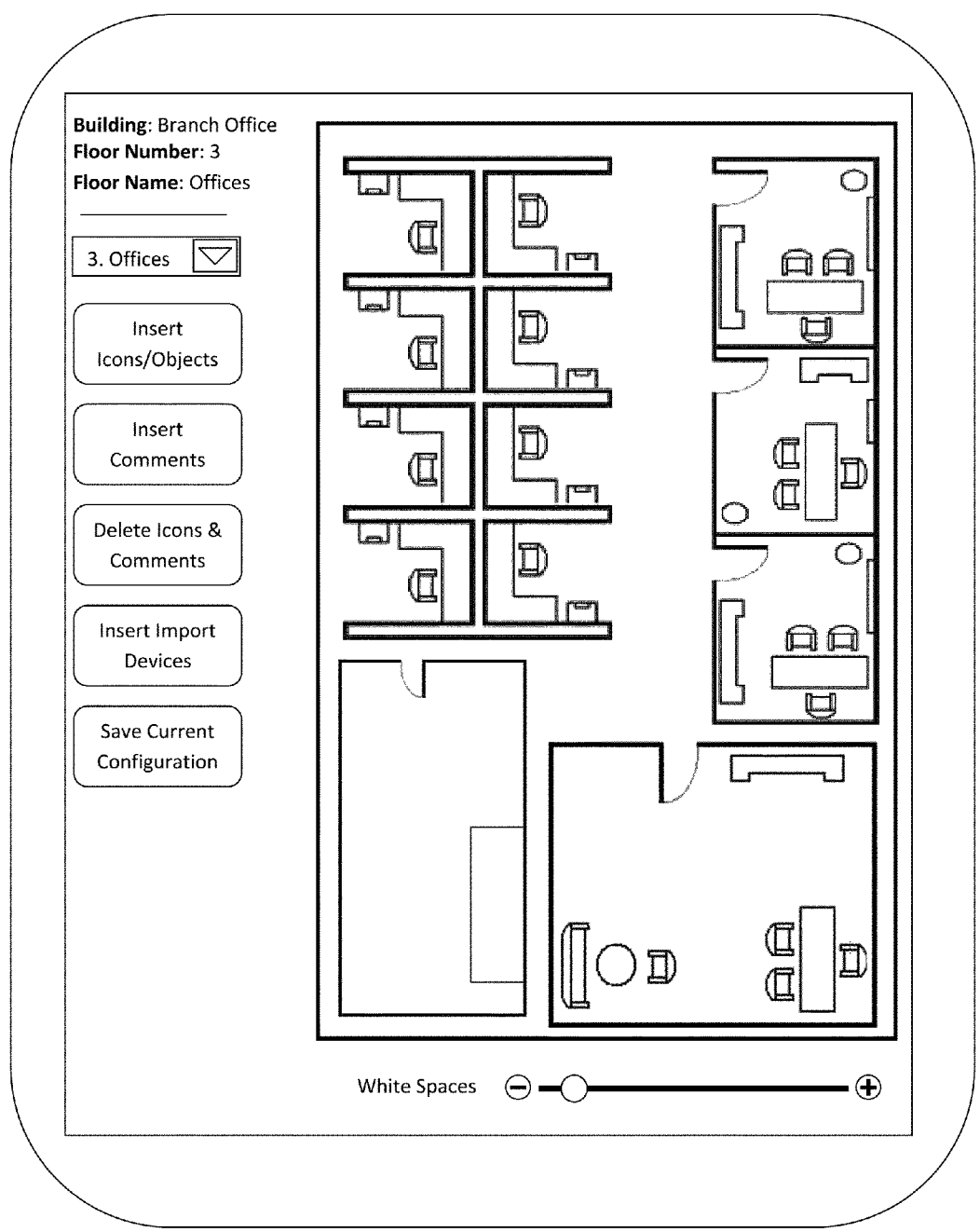
Figure 9C:
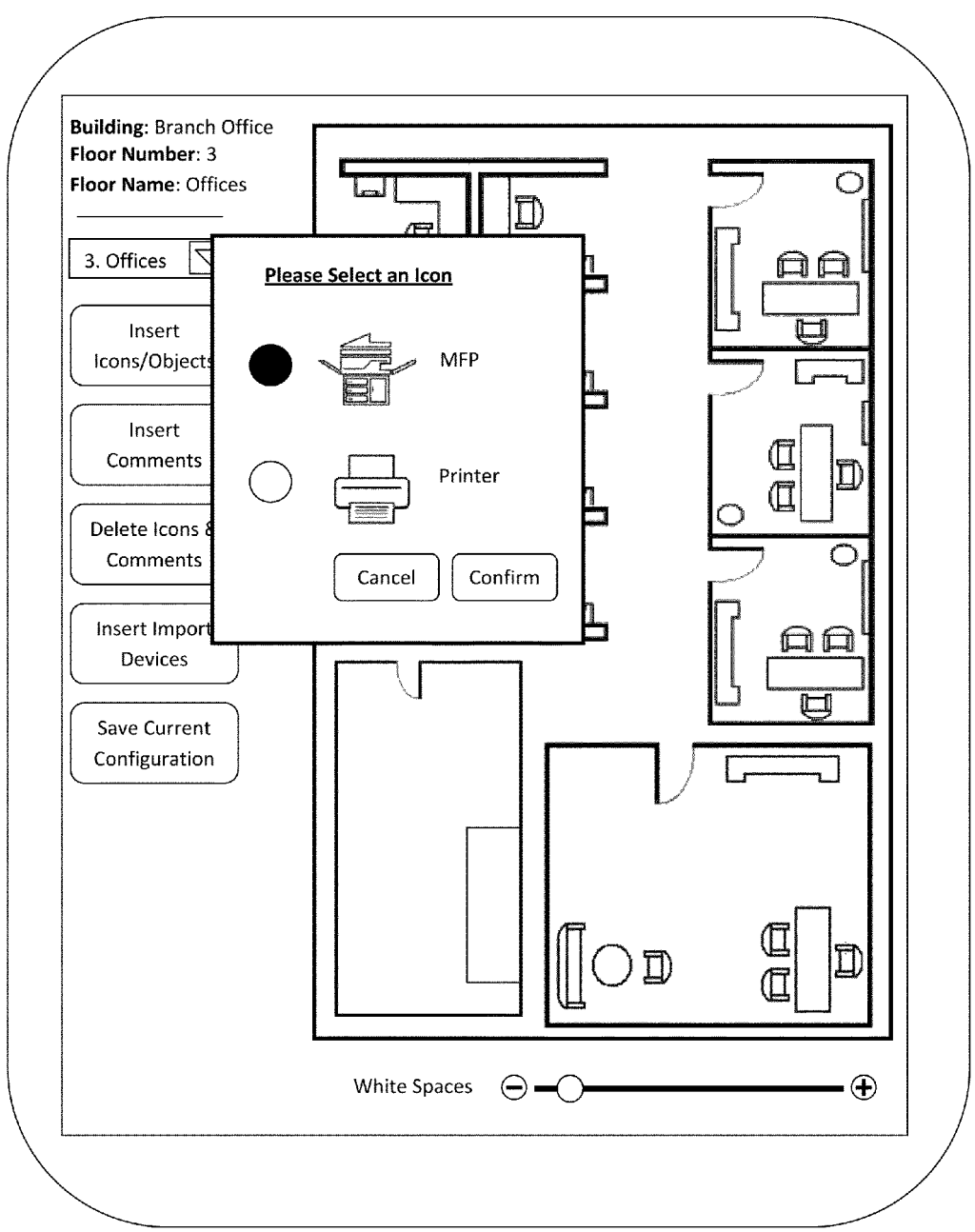

When the user requests to edit the floor map (step S801), the user is presented with a user interface screen displaying the floor map (step S802) as illustrated in FIG. 9B. The floor map displays a typical office space which contains a group of cubicles on the top left of the user interface screen, a group of small offices on the top right of the user interface screen, a large office on the bottom right of the user interface screen and a large empty room on the bottom left of the user interface screen. In addition, the application 101a further presents to the user options for placing icons and comments on the floor map (step S803). Next, the terminal receives a request from the user to place an icon onto the floor map (step S804) and displays a user interface screen to the user as shown in FIG. 9C. The icon may be any representation of any device. In this case, the icon can be either an MFP or a printer. After the user has made the selection by pressing the "confirm" button, the user may place the icon anywhere on the floor map which is then displayed by the application 101a (step S805).

Figure 9D:
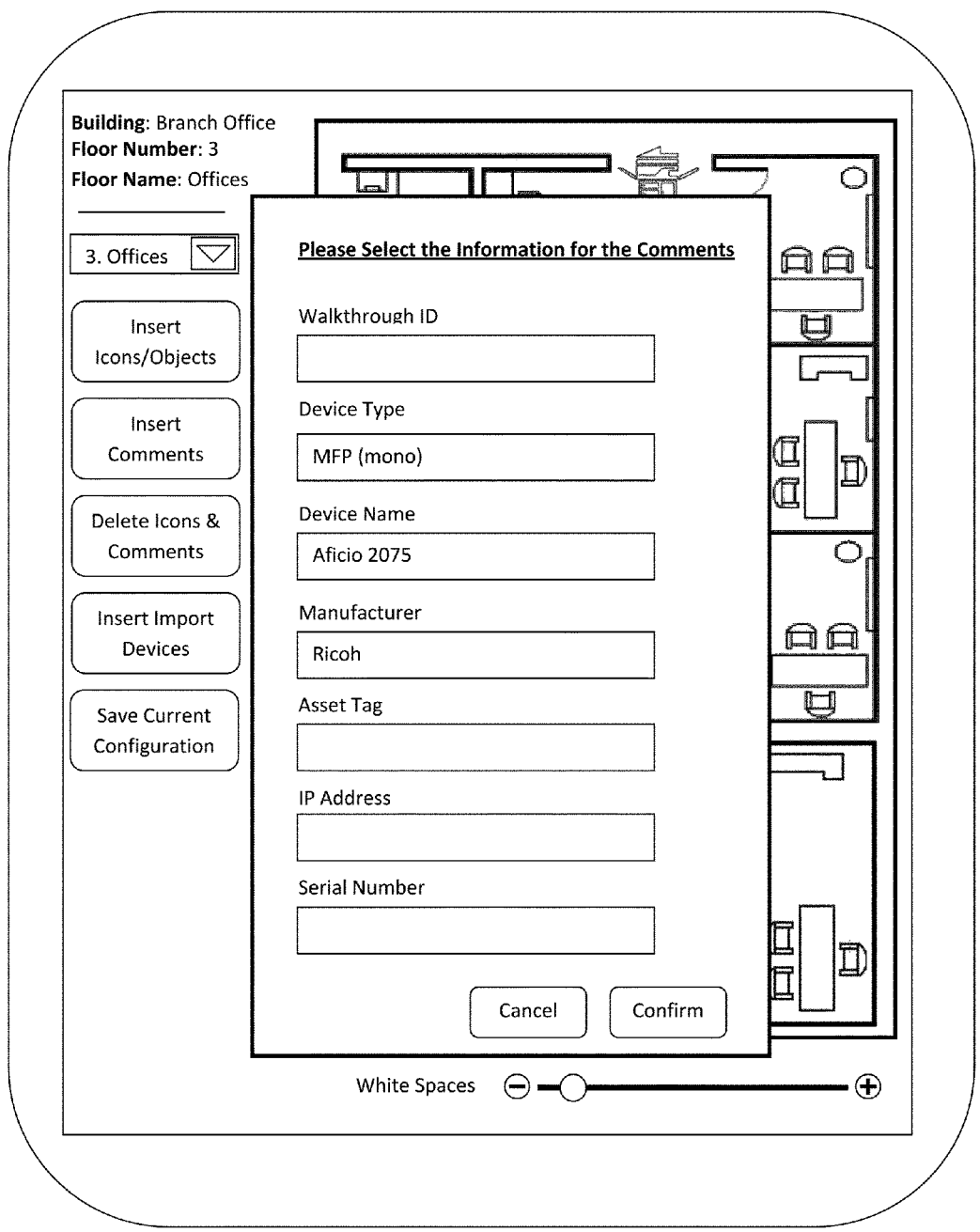

Next, the user requests to place comments which correspond to the icon placed onto an area of the map (step S806), and in response to such request the application 101a presents a user interface screen to the user as illustrated in FIG. 9D. As shown the user is prompted to enter information regarding the device (step S807) such as "Walkthrough ID", "Device Type", "Device Name", "Manufacturer", "Asset Tag", "IP Address" and "Serial Number". However, these examples should not constitute an exhaustive list of information that the user can enter. Additional information, though not exhaustive either, is shown in FIG. 10.

Further, it should be noted that the user is not required to enter all of the information. It is possible that, for whatever reason, the comments may be devoid of any information. After the user has finished inputting the formation by pressing the "Confirm" button (step S808), the user may place the comment, in this case in the form of a box, onto the floor map by pressing the intended corresponding icon. Once this action is performed, the application 101a places the comment box onto any white space surrounding the floor map (step S809).

Figure 9E:
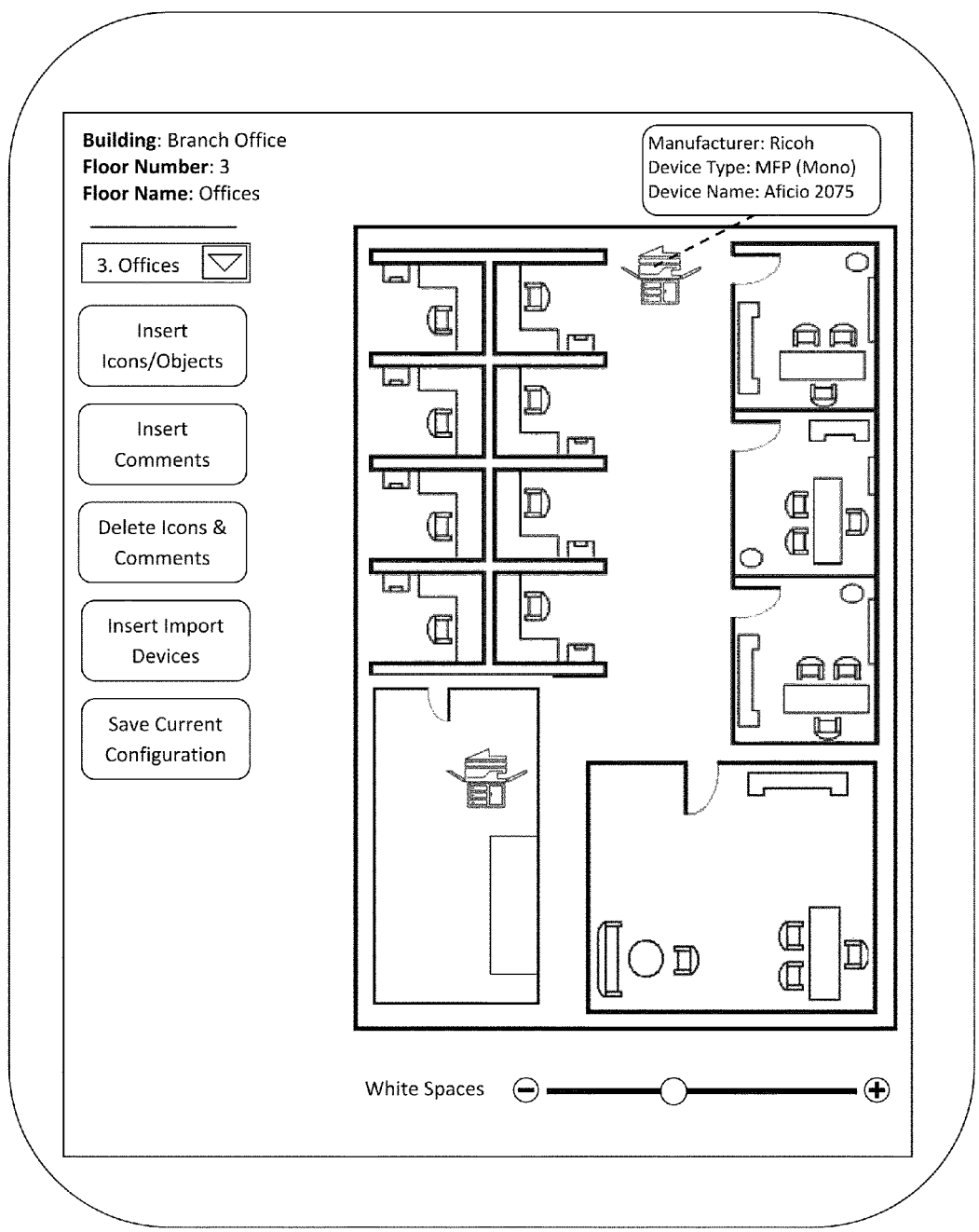
Figure 9F:
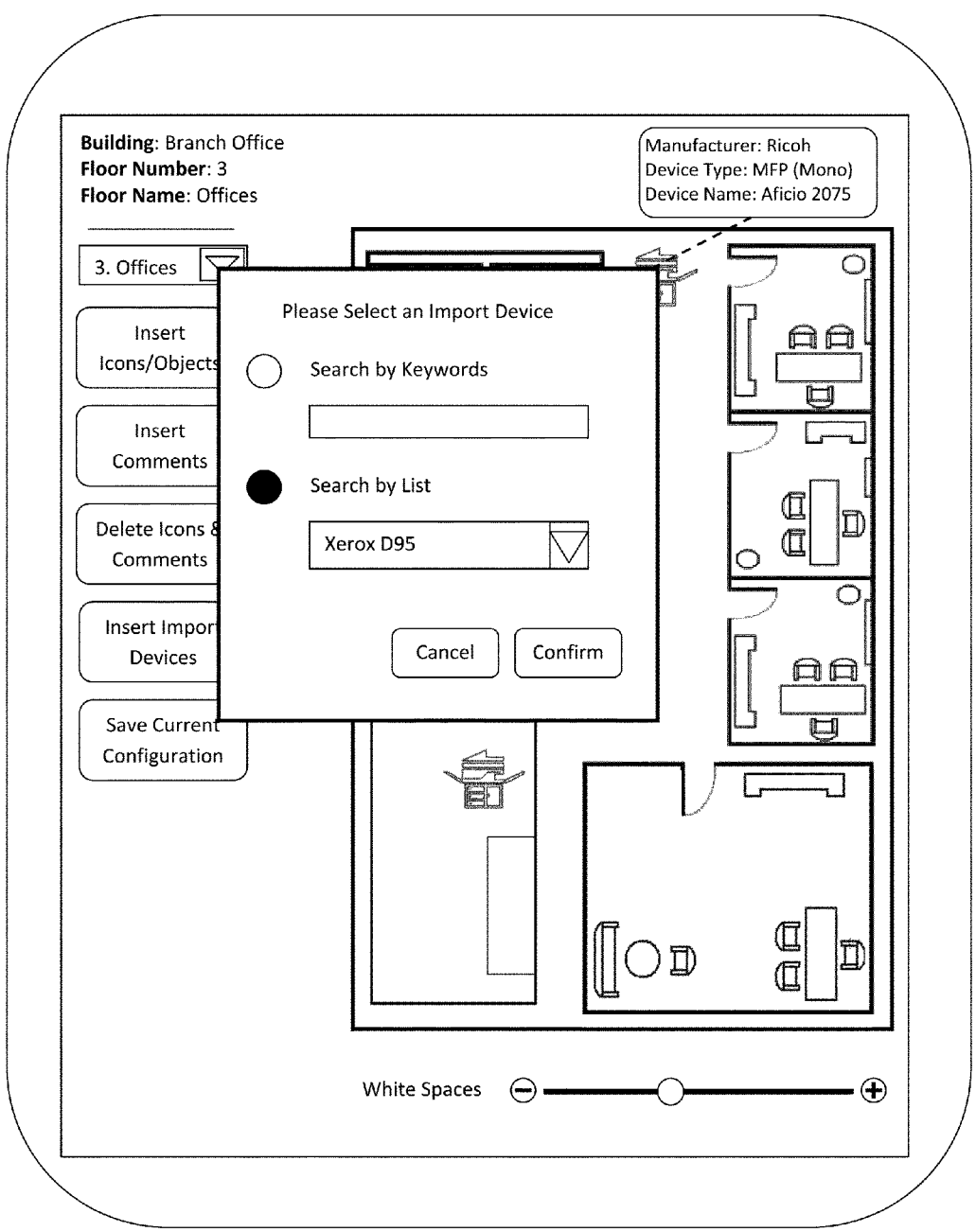

However, device information input or imported by the user may be inserted onto the floor map instead of manually creating icons and comment boxes. The user may be able to do this by pressing the "Insert Import Devices" button which causes the terminal to provide a user interface screen as illustrated in FIG. 9F, through which the user can search, by keyword, for devices. For example, the user may enter model name or manufacturer's name. In addition, the user may select the device from a list. In this case, the user may click the triangle-shaped button to have a drop down list appear and then from that drop down list, select a device. After performing the selection of the device, the user may press the "Confirm" button which causes the application 101a to present to the user with an icon and comment box corresponding to the selected device. The user may then move the icon and comment box to any position on the floor map. After confirming the position of the icon the application 101a then automatically moves the comment box to a white space area outside of the floor map. The user can then move the comment box anywhere within the white space area as well. By moving the comment boxes to a white space area outside of the map, blocking of details in the map can be prevented.

Figure 9G:
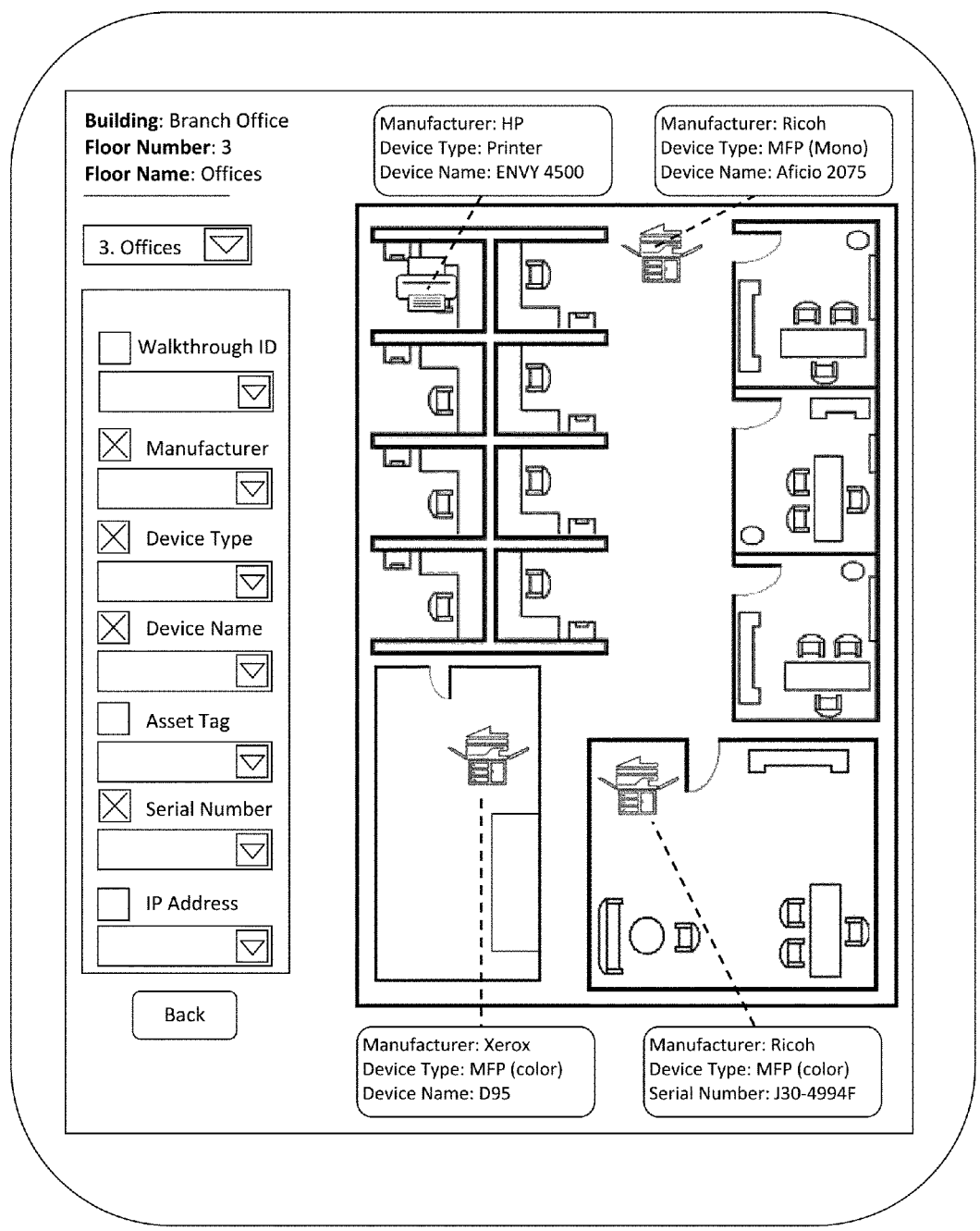

However, the area around the floor map may, in some instances, not have enough area for a comment box. Such problem can be remedied by allowing the user to adjust the white space area of the map. As shown in FIGS. 9A-9F, there is a white space adjuster located beneath the map. On the left portion of the white space adjuster there is a decreasing icon and on the right portion is an increasing icon. The adjustment icon on the bar between the increasing and decreasing icons allows the user to adjust the white space area. For example, by moving the adjustment icon to the right, the user is able to increase the white space. The white space before this adjustment process is shown in FIGS. 9A-9D. However, after moving the adjustment icon to the right, the map becomes smaller to create more white space as illustrated in FIGS. 9E-9G. As a result, the user can now have enough space to place the comment boxes on the map. Thus, the comment boxes no longer block portions of the map.

After the user has finished placing the icons and comment boxes onto the map, the user may press the "Save the Current Configuration" button to save the edited map. Next, the user may view the saved map by pressing the "View/Edit Existing Maps" button as shown in FIG. 7B which causes the application 101a to present the user with the user interface screen illustrated in FIG. 9G. As shown, the left portion of the user interface screen shows a listing of device information. Each category of the device information (i.e. Walkthrough ID, Manufacturer, Device Type, etc.) contains a box to the left of it. The significance of this box is that it allows the user to set what information is to be view in each comment box on the map. For example, as shown, the user has checked each box for or, in other words, selected the categories for "Manufacturer", "Device Type", "Device Name" and "Serial Number". What this means is that the comment box displays only that information. It does not show "Walkthrough ID" or "Asset Tag" because the user did not select those categories to be displayed in the comment boxes.

Further, as stated before, the devices may not all have the same information. This can be either from lack of knowledge of that information or due to the device simply not possessing it. For example, the application 101a may have information regarding the manufacturer, device name and serial number for a printer A. However, a printer B which is a prototype designed by several engineers in the organization may not have information regarding a manufacturer or even a serial number. Thus, the devices may not all have the same information. This is important since if the user selects a certain category to be shown in the comment box, that category is not displayed for a device that lacks information for that category. For example, as shown in FIG. 9G, the user has selected the categories for "Serial number" and "Device Name". However, only the devices at the top left, top right and bottom left of the map includes information for "Device Name". As a result the comment box displays that information. On the other hand, the device at the bottom right of the map does not include information for "Device Name". Consequently, the comment box does not display the "Device Name" category. Instead, the device at the bottom right possesses information for "Serial Number" which is unlike the other three devices. As a result, it is displayed in the comment box.

Figure 9H:
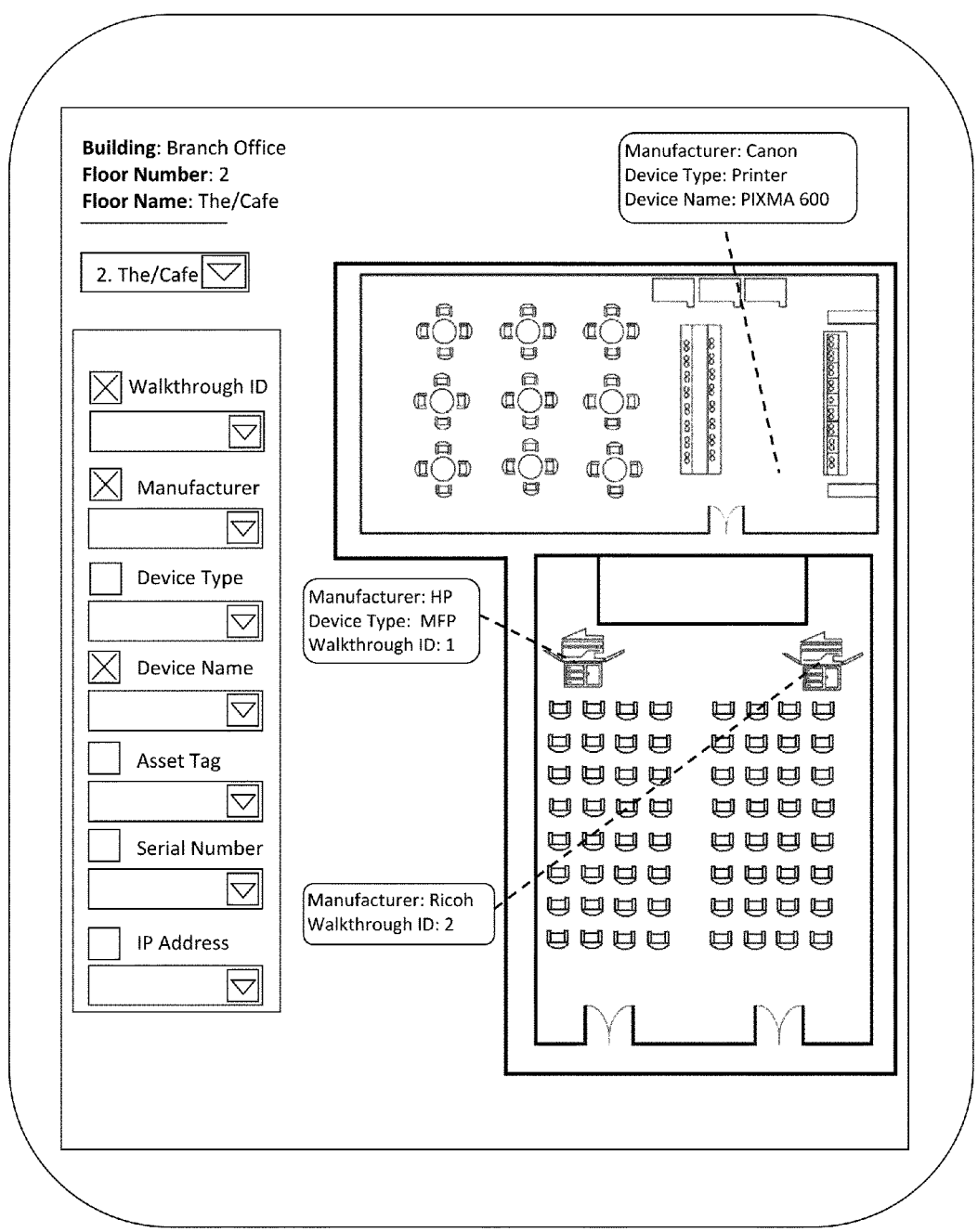

In an exemplary embodiment, the shape of the map may not always be rectangular as shown in FIG. 9H. In this case, the map is of the second floor of the "Branch Office" building and is L-shaped. The application 101a recognizes that the map is in this shape and allows the user to place comment boxes at positions that are not allowed in normal maps that are shaped like a rectangle. For example, two comment boxes are shown at areas in which they would intersect the map had the map been rectangular shaped. Further, it should be noted that the user also has the ability to change the size of the comment boxes as well. As shown in FIG. 9H, each of the three comment boxes has a different size. The user may make these adjustments by clicking and dragging the borders of the comment boxes. The reason for this may be that the user wants to have the map at a certain size but cannot fit the comment boxes. Consequently, the user may adjust the size of the comment boxes in order to allow the comment boxes to fit in the white space.

Figure 11:
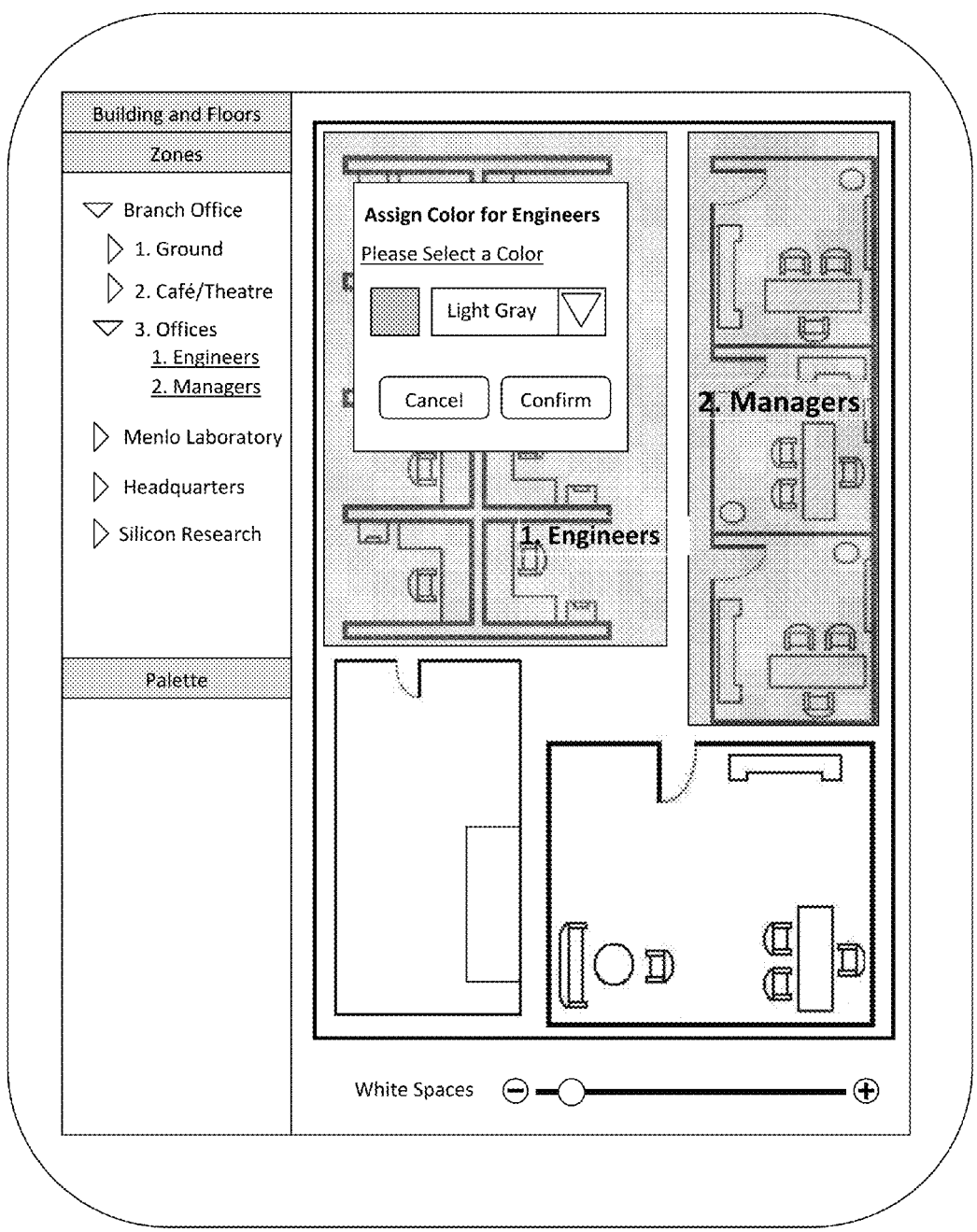
FIG. 11 show an example of a user interface screen provided by a map application, according to an exemplary embodiment.

In another exemplary embodiment, the user may also create zones in the map as well. One reason to create a zone may be to group employees together for labeling. This may make organization much easier. By clicking the "Zones" tab in FIG. 9A the application 101a presents a user interface screen as shown in FIG. 11. Here, the user is shown the workgroups previously input. In this example, the user has decided to create zones for the workgroups in the third floor of the building (i.e. Offices). By expanding each tab, the user is eventually presented with the workgroups for "Engineers" and "Managers". To create a zone, the user first selects a workgroup. Then the user draws a shape surrounding the area that the user wishes to define as a zone. It should be noted that the shape is not limited to a rectangle it can be any shape such as a square, trapezoid, triangle, circle, hexagon, etc. Further, the shape can also be abstract as well. After drawing the shape, the application 101a prompts the user to place a labeling identifying that zone with its particular workgroup. In addition, the user may also change the color of each zone as well. This allows easier distinguishing between each zone. For example, in this case, the user has opted to color the zone "Managers" with a darker shade of grey than the zone "Engineers". The orders in which the steps are performed in the aforementioned methods are not limited to those shown in the examples of FIGS. 6 and 8, and may be switched as long as similar results are achieved. Also, it should be noted that the methods illustrated in the examples of FIGS. 6 and 8 may be implemented using any of the systems described in connection with FIGS. 2A and 2B.

As discussed supra, the map application 101a can be configured to provide map functionalities and/or embedded within another application that has various other functionalities. For example, the map application may be embedded within a device information management application that enables the user to organize and present device information to manage devices based on their physical location on floormap images.

The map application may enable the user to organize such location or map information, by creating floors for a site, and for each floor, create and associate a map with the floor. For example, the user may upload a floormap image file to the system, and can place device icon on the floormap via drag and drop. The device icons can vary, such as based on device type (e.g., copier, printer, scanner, fax, MFP, etc.), configuration (e.g., color or mono, A3 or A4 paper available, networked or non-networked, etc.

In addition to device icons, the user can place a comment box in association with device icon. The comment box can show selected device fields (such as model name, system ID, manufacturer, etc.) to allow the device to be distinguished easily. On the other hand, it may be desirable sometimes to see the floormap under the comment box. Accordingly, the map application is configured to allow the user to move the comment box to another location on the screens by drag and drop, and after the comment box is moved, the device and the comment box may be connected with a line to associate them with each other. In addition, the map application can be configured to allow the user to selectively turn on and turn off display on the floormap of each comment box individually, or the comment box functionality as a whole.

Further, the map application can be configured to allow the user to pick-and-choose the contents of the comment box. For example, the user interface may include a device details pane, and the user may be permitted to select items, via the device details pane, to be displayed in the comment box. Thus, the user can easily turn on and turn off each displayed item dynamically.

In addition, the map application can allow the user to add white space surrounding, or on one or more sides of, the floormap image, to provide more space to place comment boxes. When such white space is provided, the map application can be configured to automatically place a comment box in the white space. Also, the map application can allow the user to adjust the location, size and/or dimensions of the white space. For example, when the white space is provided, slide bars may be provided to adjust the vertical and horizontal dimensions of the white space. Thus, the user can adjust the size and/or dimensions of the white space, and the system dynamically changes the white space displayed on the screen in response to the user-indicated adjustment. When the user reduces the size of the white space (i.e. to be smaller) there may be some instances in which the system will automatically adjust the position of the comment box and consequently the comment box may overlap the floormap image, at least in part.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A map application including one or more programs of instructions embodied in a non-transitory computer readable storage medium and executable by a computer, wherein the map application executable by the computer comprises:
a map display interface that displays a floormap on an electronic display, one or more user-selectable device objects being shown on the displayed floormap; and
an annotation interface that captures user-entered device information as an annotation object, causes the map display interface to display the annotation object capturing the user-entered device information and superimposed on the floormap displayed on the electronic display, and permits the user to relocate the annotation object from a first position on the floormap to another position on the floormap, wherein
the annotation interface provides a device details user interface including plural device fields associated with the selected device object, the device details user interface being configured to (a) receive user selection of one or more device fields amongst the plural device fields associated with the selected device object and (b) receive user input or selection of device-associated values corresponding to the selected device fields that are to be inserted in the displayed annotation object superimposed on the floormap, wherein each device-associated value selected or input by the user is inserted in the displayed annotation object superimposed on the floormap.

2. The map application of claim 1, wherein the annotation interface includes a user interface part to receive user instruction to turn on and turn off display of the annotation object.

3. The map application of claim 1, wherein
the map display interface is configured to permit user selection of a device object shown on the floormap, and to associate the annotation object with the selected device object.

4. The map application of claim 3, wherein the map display interface causes the annotation object to be shown initially at the first position near the device object to which the annotation object is associated.

5. The map application of claim 1, wherein one or more of the device-associated values are automatically inserted in the displayed annotation object.

6. The map application of claim 1, wherein the displayed floormap includes a floor portion corresponding to space on the floor of the office facility and a whitespace portion disposed to border at least one side of the floor portion and not corresponding to any space on the floor of the office facility.

7. The map application of claim 6, wherein the whitespace portion surrounds the floor portion.

8. The map application of claim 6, wherein the map display interface includes a whitespace adjustment part for user adjustment of at least one of position, size and dimensions of the whitespace portion, and the map display interface dynamically adjusts the displayed whitespace portion in response to the user adjustment.

9. The map application of claim 6, wherein the map display interface automatically places the annotation object in the whitespace portion.

10. A computer program product including one or more programs of instructions embodied in a non-transitory computer readable medium and executable by a computer, wherein the computer program product executable by the computer comprises:
a map display interface that displays a floormap on an electronic display, wherein one or more device objects are shown on the floormap; and
an annotation interface that captures user-entered device information as an annotation object, wherein
the map display interface is configured to permit user selection of a device object shown on the floormap and to associate the annotation object with the selected device object, and wherein
the map display interface displays the annotation object capturing the user-entered device information, superimposed on the floormap displayed on the electronic display, and permits the user to relocate the annotation object from a first position on the floormap to another position on the floormap, wherein
the annotation interface provides a device details user interface including plural device fields associated with the selected device object, the device details user interface being configured to (a) receive user selection of one or more device fields amongst the plural device fields associated with the selected device object and (b) receive user input or selection of device-associated values corresponding to the selected device fields that are to be inserted in the displayed annotation object superimposed on the floormap, wherein each device-associated value selected or input by the user is inserted in the displayed annotation object superimposed on the floormap.

11. The computer program product of claim 10, wherein one or more of the device-associated values are automatically inserted in the displayed annotation object.

12. The computer program product of claim 10, wherein the displayed floormap includes a floor portion corresponding to space on the floor of the office facility and a whitespace portion disposed to border at least one side of the floor portion and not corresponding to any space on the floor of the office facility.

13. The computer program product of claim 12, wherein the map display interface includes a whitespace adjustment part for user adjustment of at least one of position, size and dimensions of the whitespace portion, and the map display interface dynamically adjusts the displayed whitespace portion in response to the user adjustment.

14. The computer program product of claim 12, wherein the map display interface automatically places the annotation object in the whitespace portion.

15. The computer program product Of claim 12, wherein the whitespace portion surrounds the floor portion.

16. The computer program product of claim 10, wherein the annotation interface includes a user interface part to receive user instruction to turn on and turn off display of the annotation object.

17. A method performed by a computer program product, the method comprising:
  displaying a floormap on an electronic display, one or more user-selectable device objects being shown on the displayed floormap;
  providing an annotation interface to capture user-entered device information as an annotation object and associating the annotation object with a selected device object;
  displaying the annotation object capturing the user-entered device information, superimposed on the displayed floormap and permitting the user to relocate the annotation object from a first position on the floormap to another position on the floormap;
  providing a device details user interface including plural device fields associated with the selected device object, to (a) receive user selection of one or more device fields amongst the plural device fields associated with the selected device object and (b) receive user input or selection of device-associated values corresponding to the selected device fields that are to be inserted in the displayed annotation object, wherein each device-associated value selected or input by the user is inserted in the displayed annotation object superimposed on the floormap.

18. The method of claim 17, further comprising automatically inserting one or more of the device-associated values in the displayed annotation object.

* * * * *